US012534520B2

United States Patent
Kim et al.

(10) Patent No.: US 12,534,520 B2
(45) Date of Patent: Jan. 27, 2026

(54) YKL-40-TARGETING HUMAN MONOCLONAL ANTIBODY

(71) Applicant: SENELIX CO., LTD., Seoul (KR)

(72) Inventors: Dae Young Kim, Cheongju-si (KR); Kyung Jae Kang, Pohang-si (KR); Yoon Ji Kim, Cheongju-si (KR); Se Ra Lee, Sejong (KR); Jin Tae Hong, Cheongju-si (KR)

(73) Assignee: SENELIX CO., LTD., Seoul (KR)

( * ) Notice: Subject to any disclaimer, the term of this patent is extended or adjusted under 35 U.S.C. 154(b) by 993 days.

(21) Appl. No.: 17/753,682

(22) PCT Filed: Sep. 7, 2020

(86) PCT No.: PCT/KR2020/012036
§ 371 (c)(1),
(2) Date: Mar. 10, 2022

(87) PCT Pub. No.: WO2021/049830
PCT Pub. Date: Mar. 18, 2021

(65) Prior Publication Data
US 2022/0340649 A1   Oct. 27, 2022

(30) Foreign Application Priority Data
Sep. 11, 2019   (KR) .................. 10-2019-0112572

(51) Int. Cl.
*C07K 16/00*  (2006.01)
*A61P 35/00*  (2006.01)
*C07K 16/18*  (2006.01)
*G01N 33/574* (2006.01)
*A61K 39/00*  (2006.01)

(52) U.S. Cl.
CPC .............. *C07K 16/18* (2013.01); *A61P 35/00* (2018.01); *G01N 33/574* (2013.01); *A61K 2039/505* (2013.01); *G01N 2333/47* (2013.01)

(58) Field of Classification Search
CPC ............ C07K 2317/21; C07K 2317/73; C07K 2317/92
See application file for complete search history.

(56) References Cited

U.S. PATENT DOCUMENTS

| 5,876,950 | A  |    | 3/1999  | Siadak et al. |         |
|-----------|----|----|---------|---------------|---------|
| 7,670,599 | B2 |    | 3/2010  | Price et al.  |         |
| 8,053,563 | B2 | *  | 11/2011 | Bonnichsen    | A61P 35/00 |
|           |    |    |         |               | 530/387.9 |
| 2019/0002586 | A1 |    | 1/2019 | Elias et al. |         |

FOREIGN PATENT DOCUMENTS

| JP | 2008-531608    | A  | 8/2008  |
|----|----------------|----|---------|
| KR | 10-1996-0704937 | A  | 10/1996 |
| KR | 10-2142499     | B1 | 8/2020  |
| WO | WO-9506666     | A1 | 3/1995  |
| WO | WO-9623071     | A2 | 8/1996  |
| WO | WO-2006089549  | A1 | 8/2006  |
| WO | WO-2018129261  | A1 | 7/2018  |
| WO | WO-2019060675  | A1 | 3/2019  |

OTHER PUBLICATIONS

Kang, K., et al., "Selection and Characterization of YKL-40-Targeting Monoclonal Antibodies from Human Synthetic Fab Phage Display Libraries," Int J Mol Sci 21(17):6354, MDPI, Switzerland (Sep. 2020).
Cohen, S.N., et al., "Nonchromosomal Antibiotic Resistance in Bacteria: Genetic Transformation of *Escherichia coli* by R-Factor DNA," Proc. Natl. Acad. Sci. USA 69(8):2110-2114. (Aug. 1972).
Dower, W.J. et al., "High efficiency transformation of *E. coli* by high voltage electroporation," Nucleic. Acids Res. 16(13):6127-6145, IRL Press Limited, Oxford, England (Jul. 1988).
Hanahan, D., "Studies on Transformation of *Escherichia coli* with Plasmids," J. Mol. Biol. 166(4):557-580, Academic Press Inc., London (Jun. 1983).
International Search Report for International Application No. PCT/KR2020/012036, European Patent Office, Netherlands, mailed on Dec. 11, 2020, with English translation.
Uhlmann, E. and Peyman, A., "Antisense oligonucleotides: a new therapeutic principle," Chemical Reviews 90(4):543-584, American Chemical Society, United States (Jun. 1990).
Written Opinion of the International Searching Authority for International Application No. PCT/KR2020/012036, European Patent Office, Netherlands, mailed on Dec. 11, 2020, with English translation.
Faibish, M., et al., "A YKL-40-Neutralizing Antibody Blocks Tumor Angiogenesis and Progression: A Potential Therapeutic Agent in Cancers," Mol. Cancer. Ther. 10(5):742-751, American Association for Cancer Research, United States (May 2011).
Supplementary European Search Report for EP Application No. EP 20 86 2449, Munich, Germany, mailed on Jul. 27, 2023, 7 pages.

\* cited by examiner

Primary Examiner — Mark Halvorson
(74) Attorney, Agent, or Firm — Sterne, Kessler, Goldstein & Fox P.L.L.C.

(57) ABSTRACT

The present invention relates to a monoclonal antibody binding specifically to YKL-40. A high expression level of YKL-40 is associated with the proliferation and metastasis of cancer and a monoclonal antibody against YKL-40 exhibits an effect of inhibiting the proliferation and metastasis of cancer. Thus, the monoclonal antibody of the present disclosure can be advantageously used for diagnosing, preventing or treating cancer.

10 Claims, 32 Drawing Sheets

Specification includes a Sequence Listing.

[FIG. 1a]
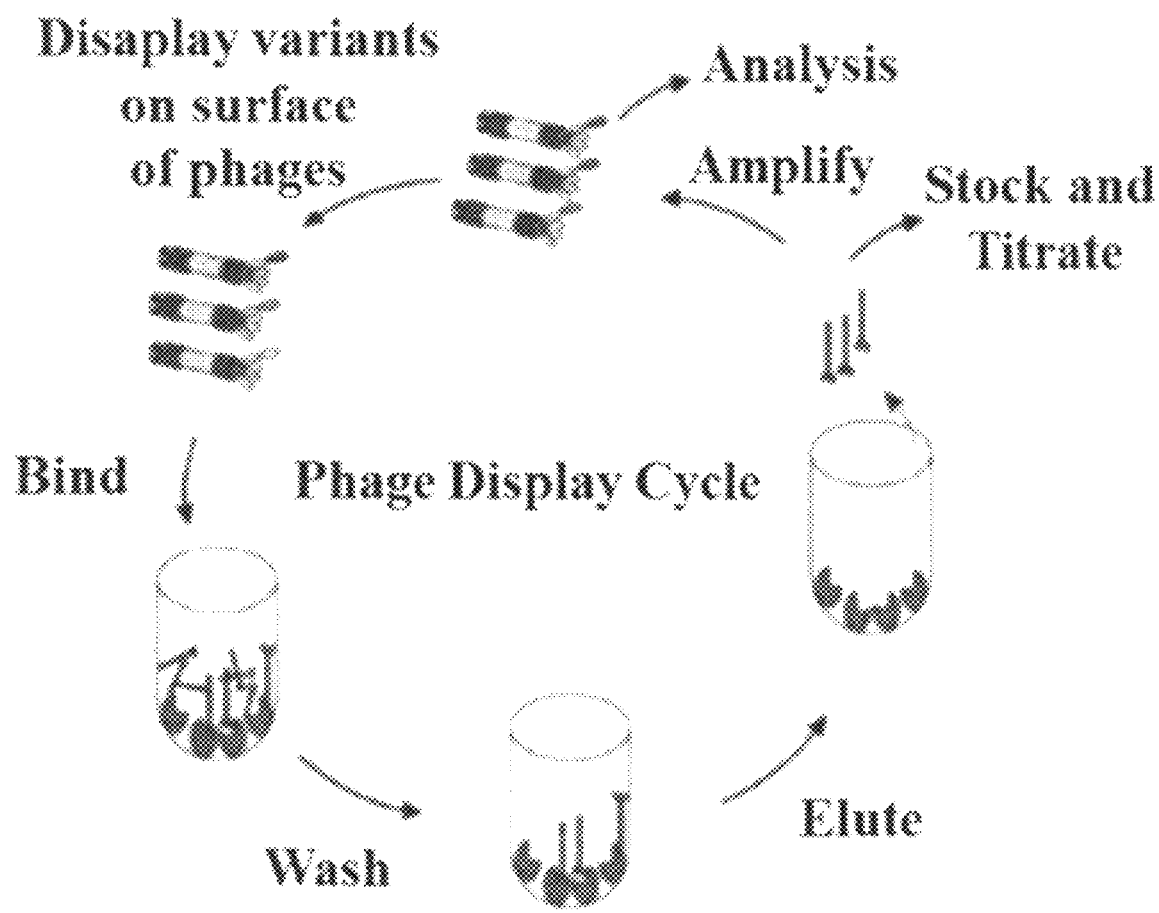

[FIG. 1b]
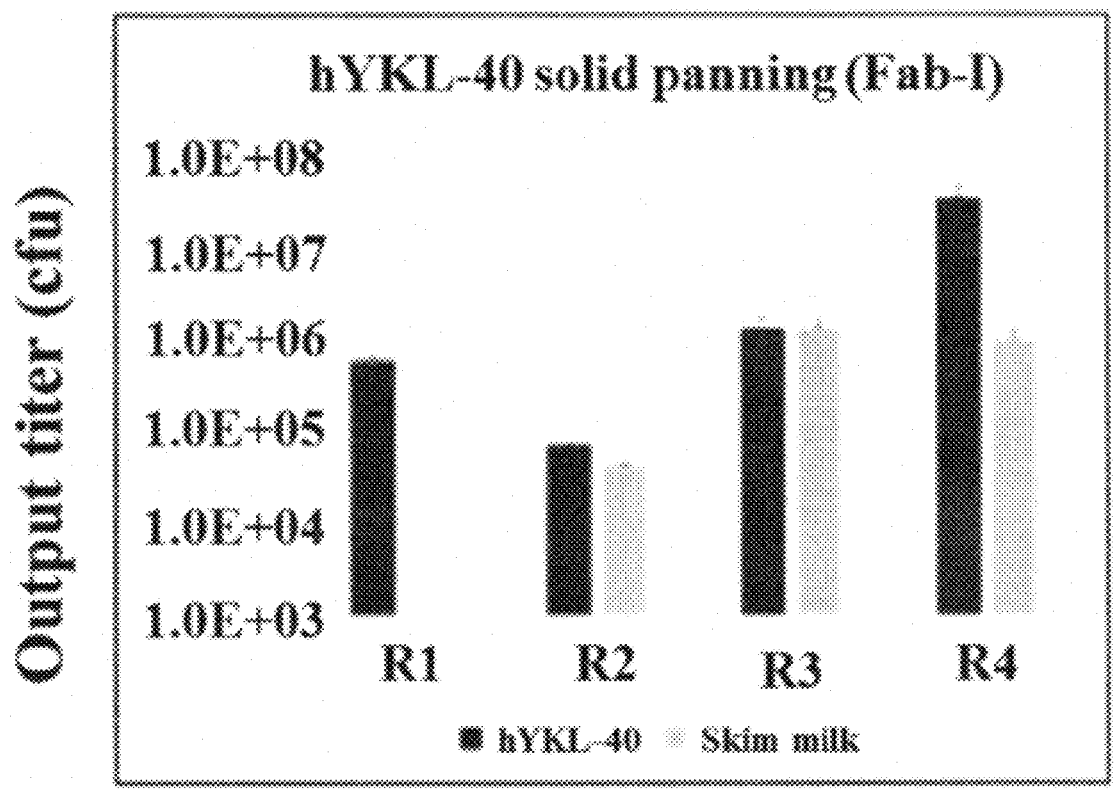
[FIG. 1c]
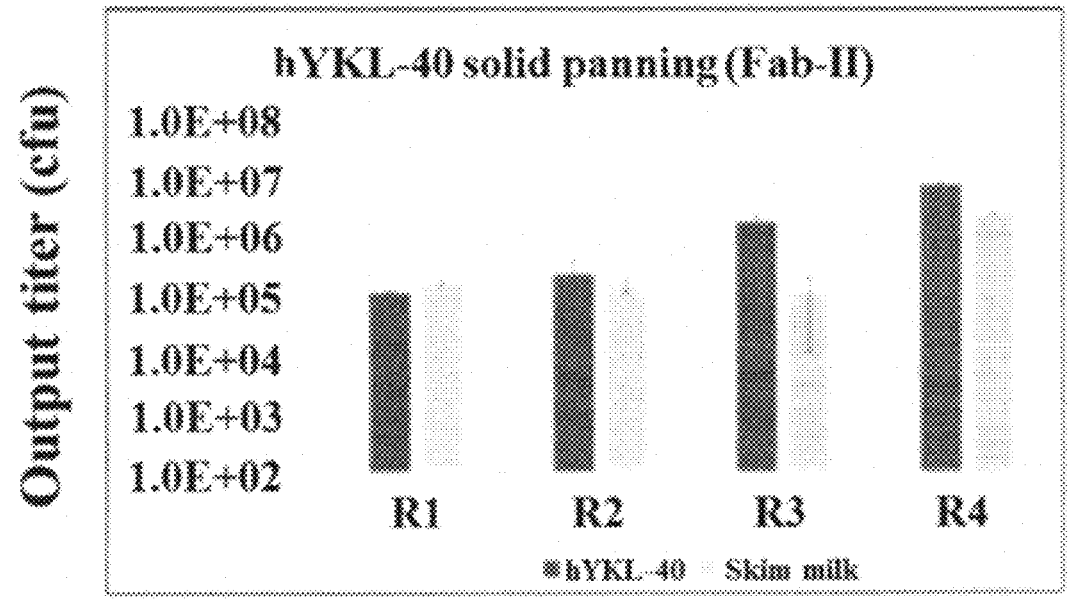

[FIG. 1d]
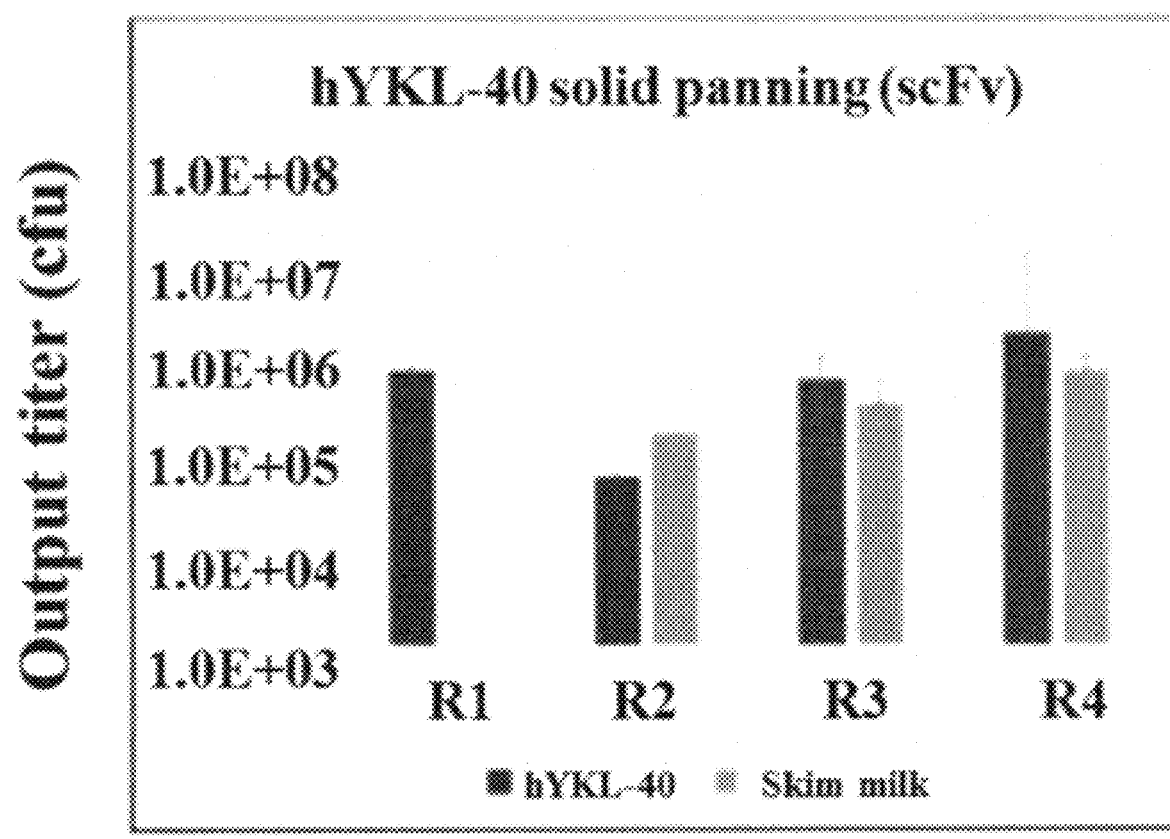
[FIG. 2a]
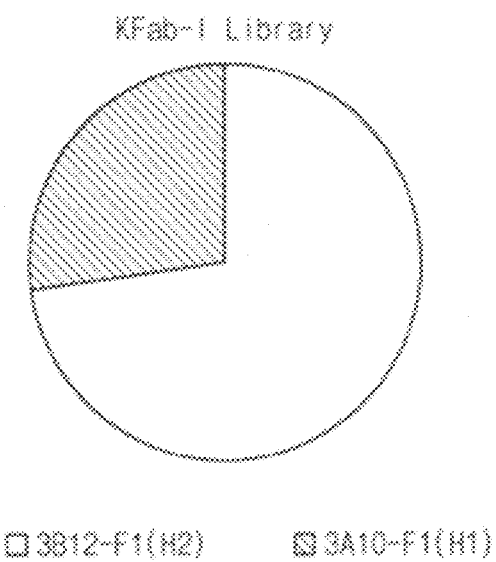

[FIG. 2b]
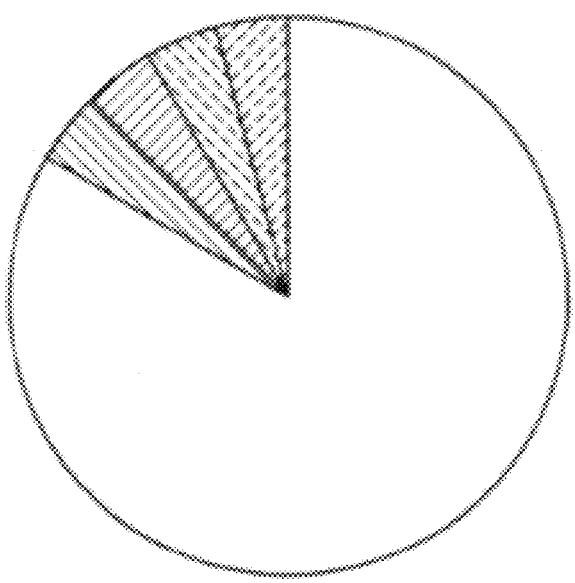
□ 3E12-F2(H6)  ▨ 3B7-F2(H4)  ▨ 3G7-F2(H7)
▨ 3D12-F2(H5)  ▨ 3A11-F2(H3)

[FIG. 3a]
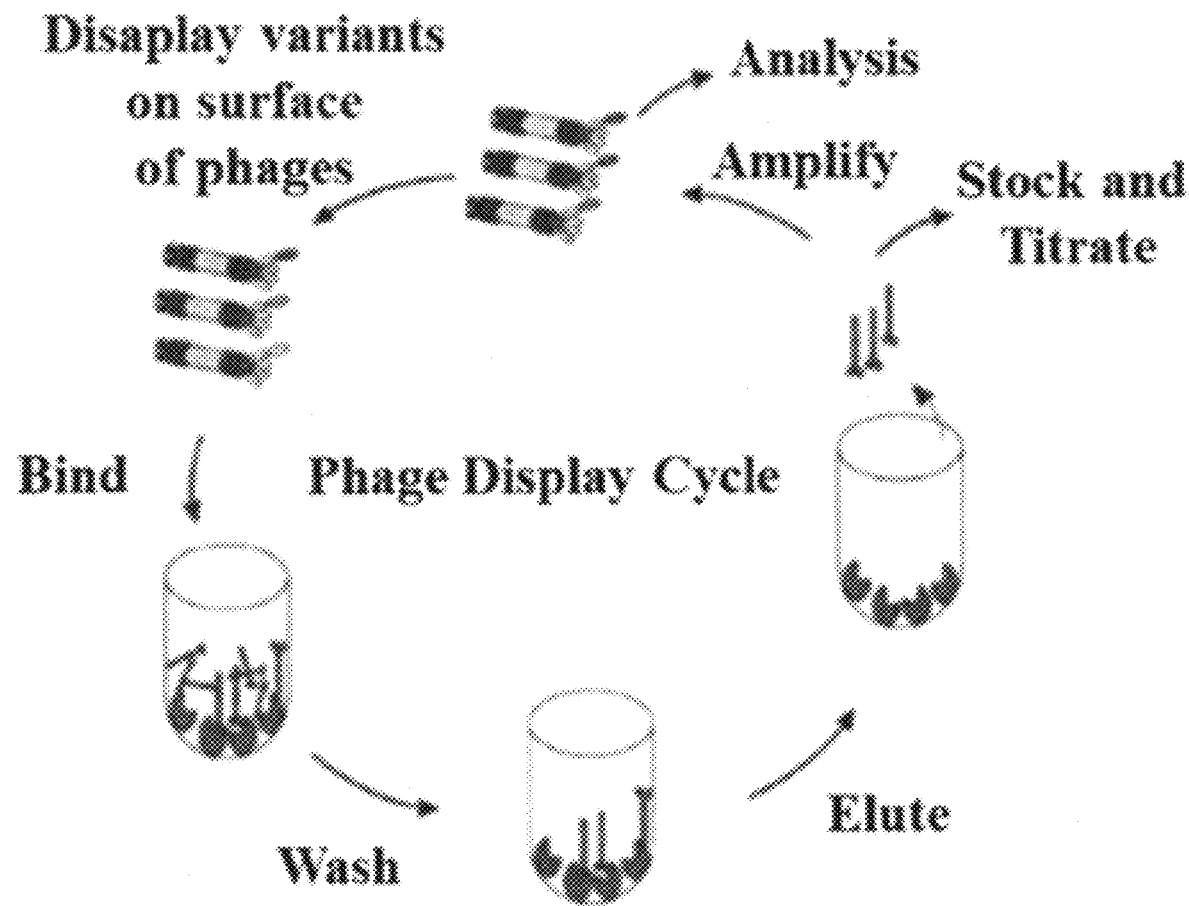

[FIG. 3b]
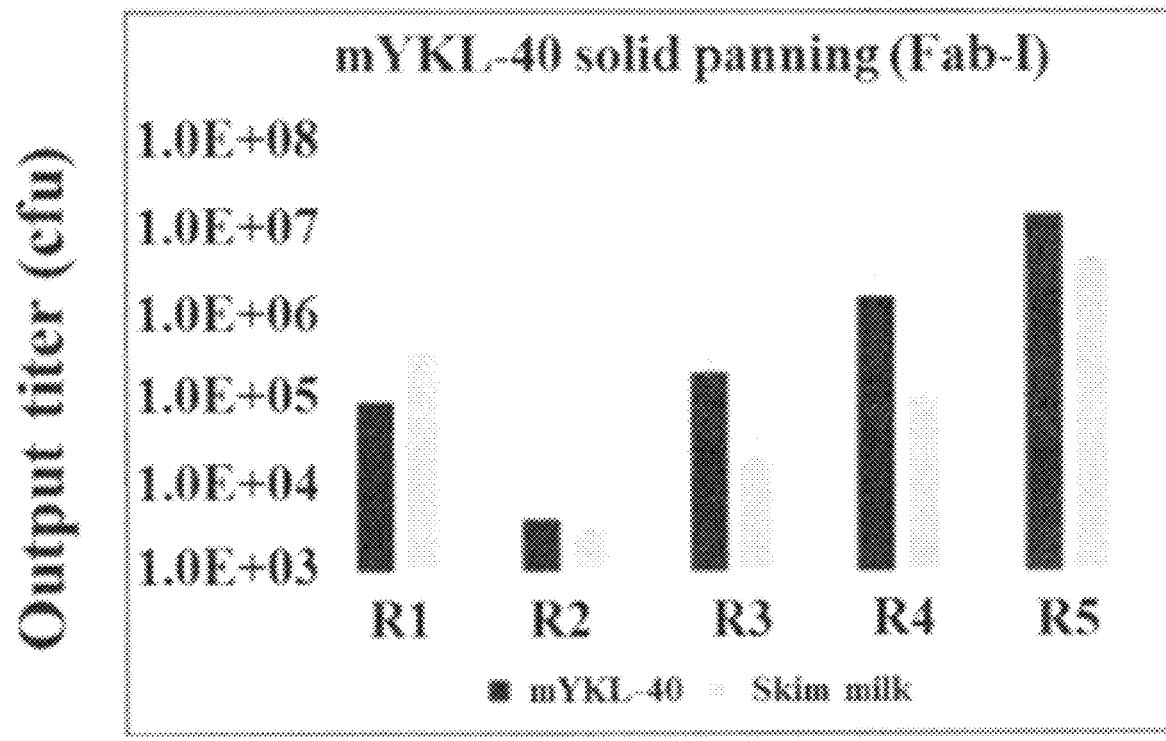
[FIG. 3c]
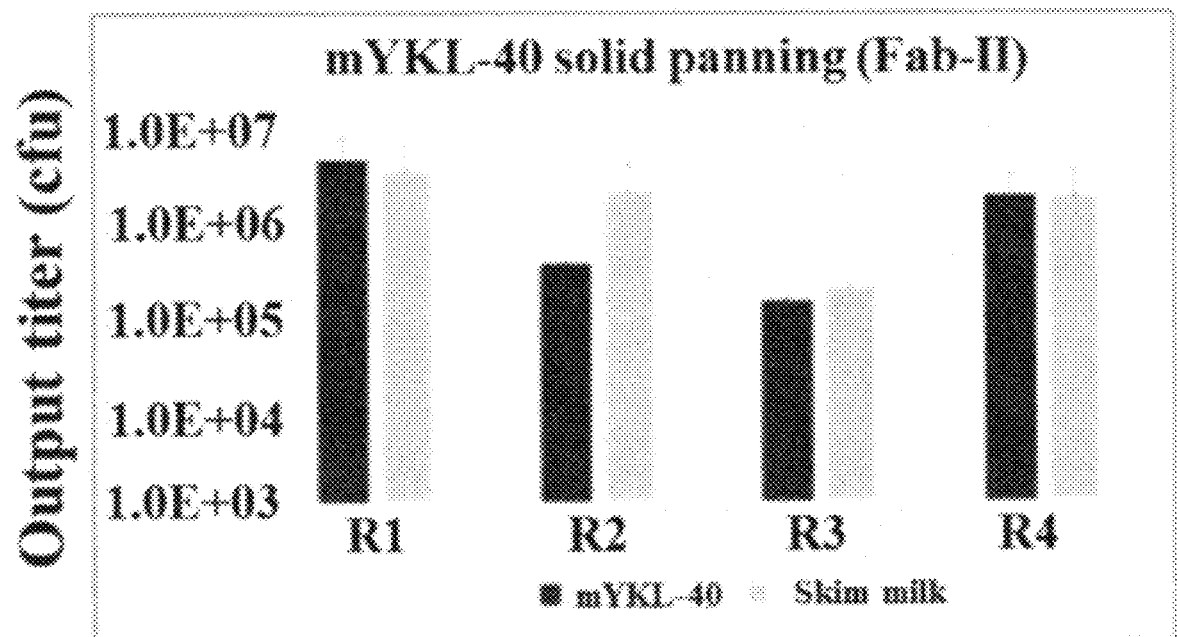

[FIG. 3d]
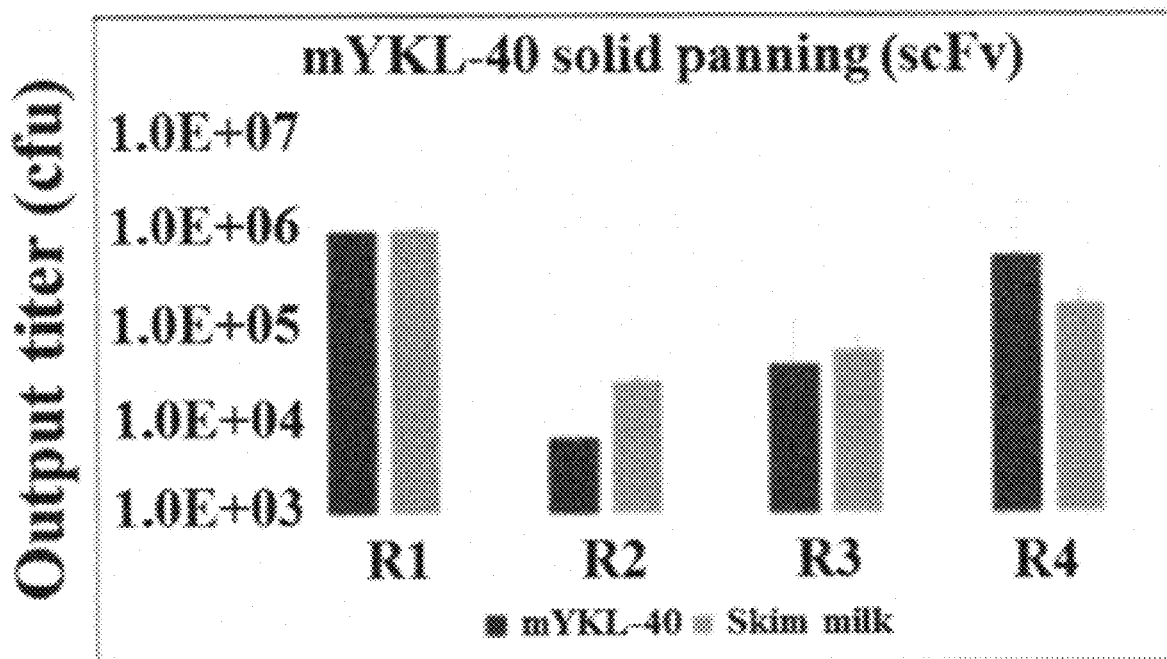
[FIG. 4]
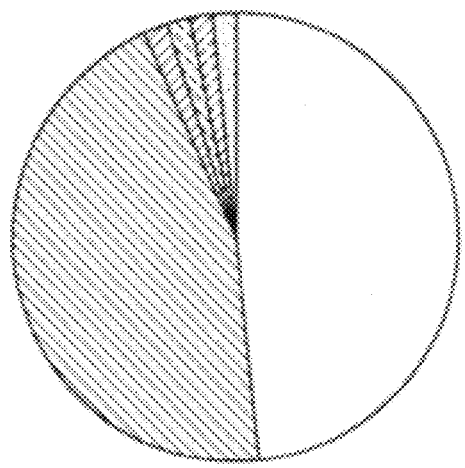
☐ 4A12-F2(M1)   ☒ 4E12-F2(M2)   ☒ 4E3-F2(M3)
☒ 4D10-F2(M4)   ☒ 4A7-F2(M5)   ☐ 4A1-F2(M6)

[FIG. 5a]
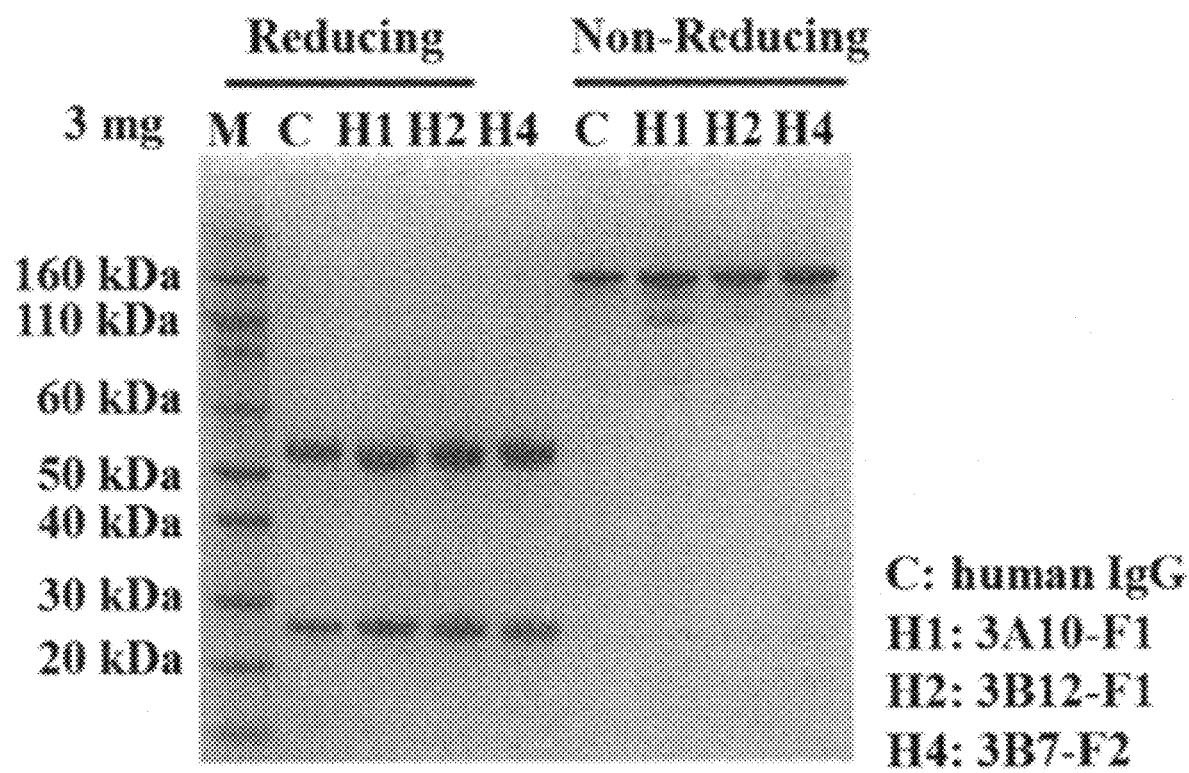

[FIG. 5b]
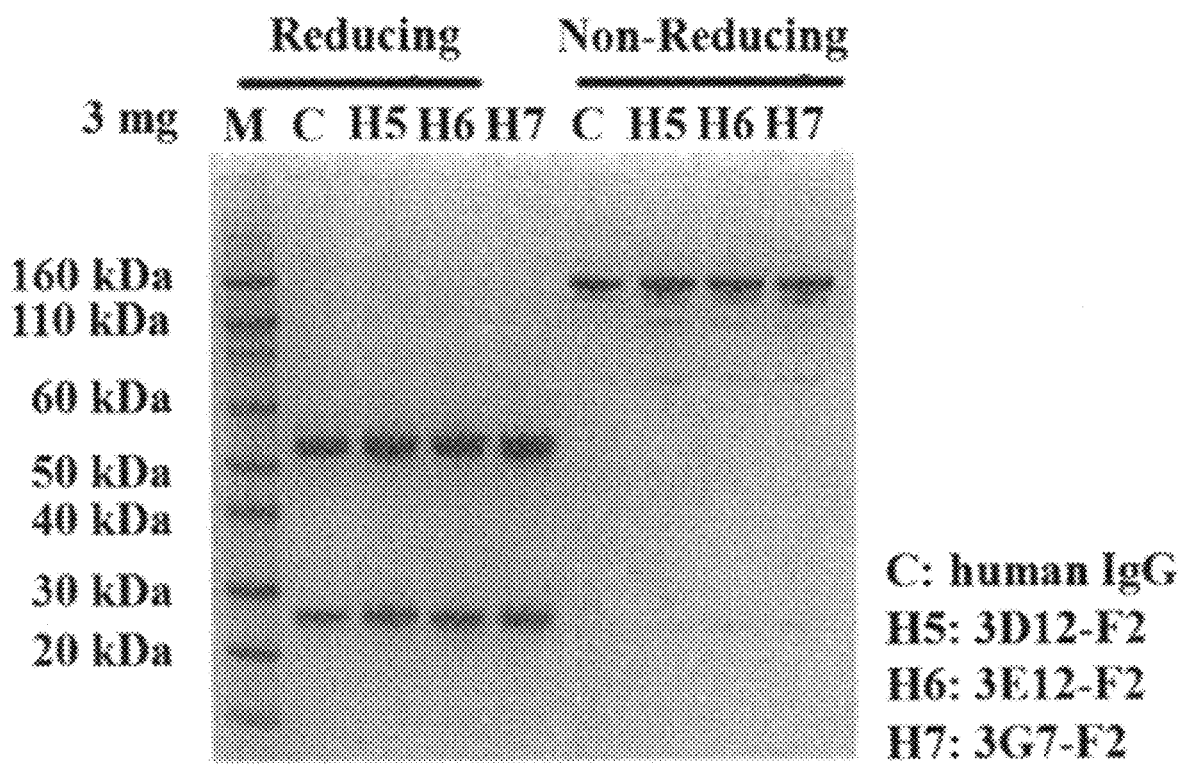
[FIG. 5c]
| Clones (IgG) | Concentration (mg/mL) | Final volume (mL) | Final yield (mg) | Note |
|---|---|---|---|---|
| 3A10-F1 (H1) | 0.43 | 0.55 | 0.236 | Expi293 300 mL culture |
| 3B12-F1 (H2) | 0.92 | 2.0 | 1.84 | Expi293 300 mL culture |
| 3B7-F2 (H4) | 1.3 | 5.0 | 6.5 | Expi293 300 mL culture |
| 3D12-F2 (H5) | 0.5 | 0.6 | 0.3 | Expi293 300 mL culture |
| 3E12-F2 (H6) | 1.15 | 0.7 | 0.8 | Expi293 300 mL culture |
| 3G7-F2 (H7) | 1.06 | 5.0 | 5.3 | Expi293 300 mL culture |
* Final yield (mg) = concentration (mg/mL) x final volume (mL)

[FIG. 6a]
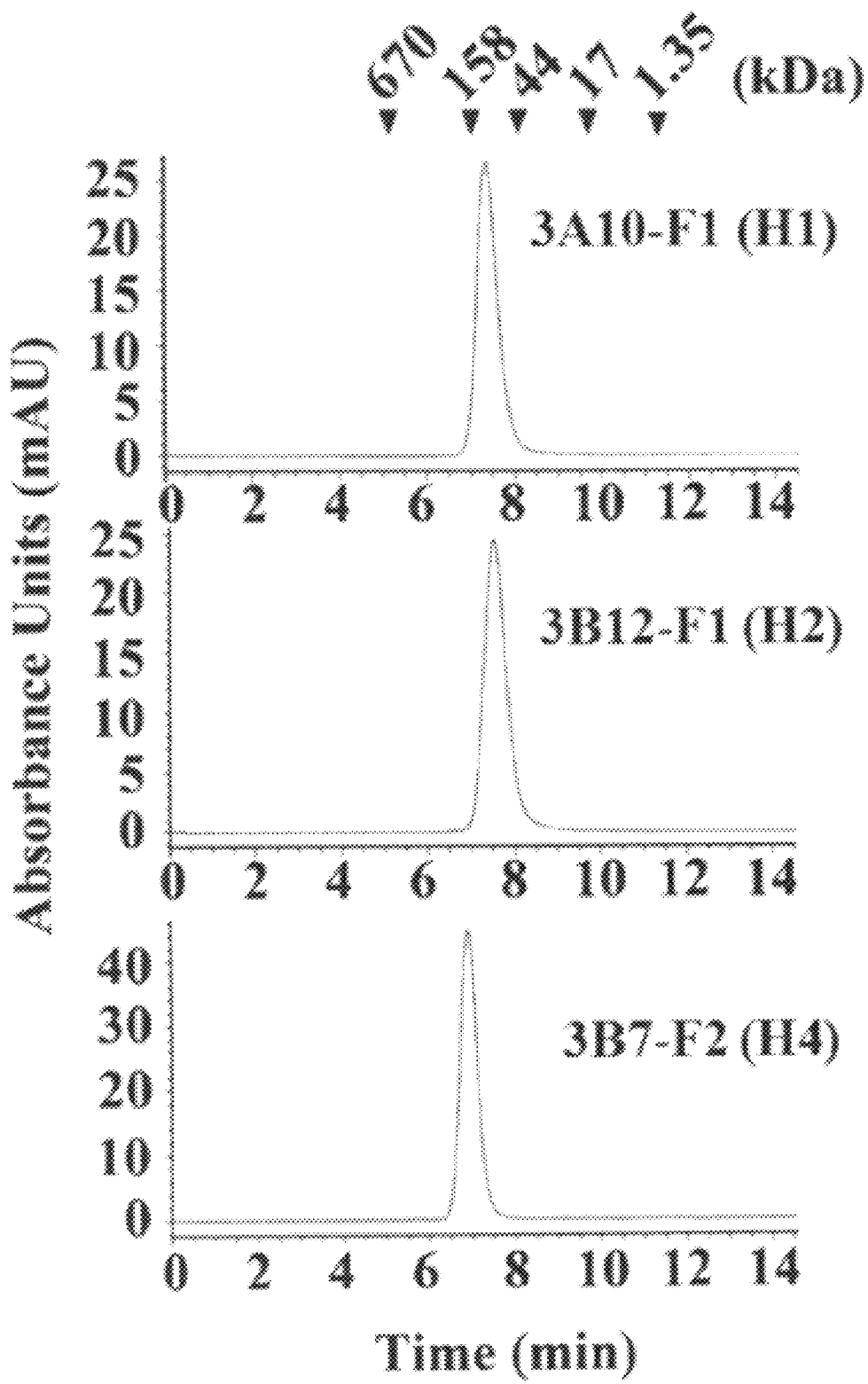

[FIG. 6b]
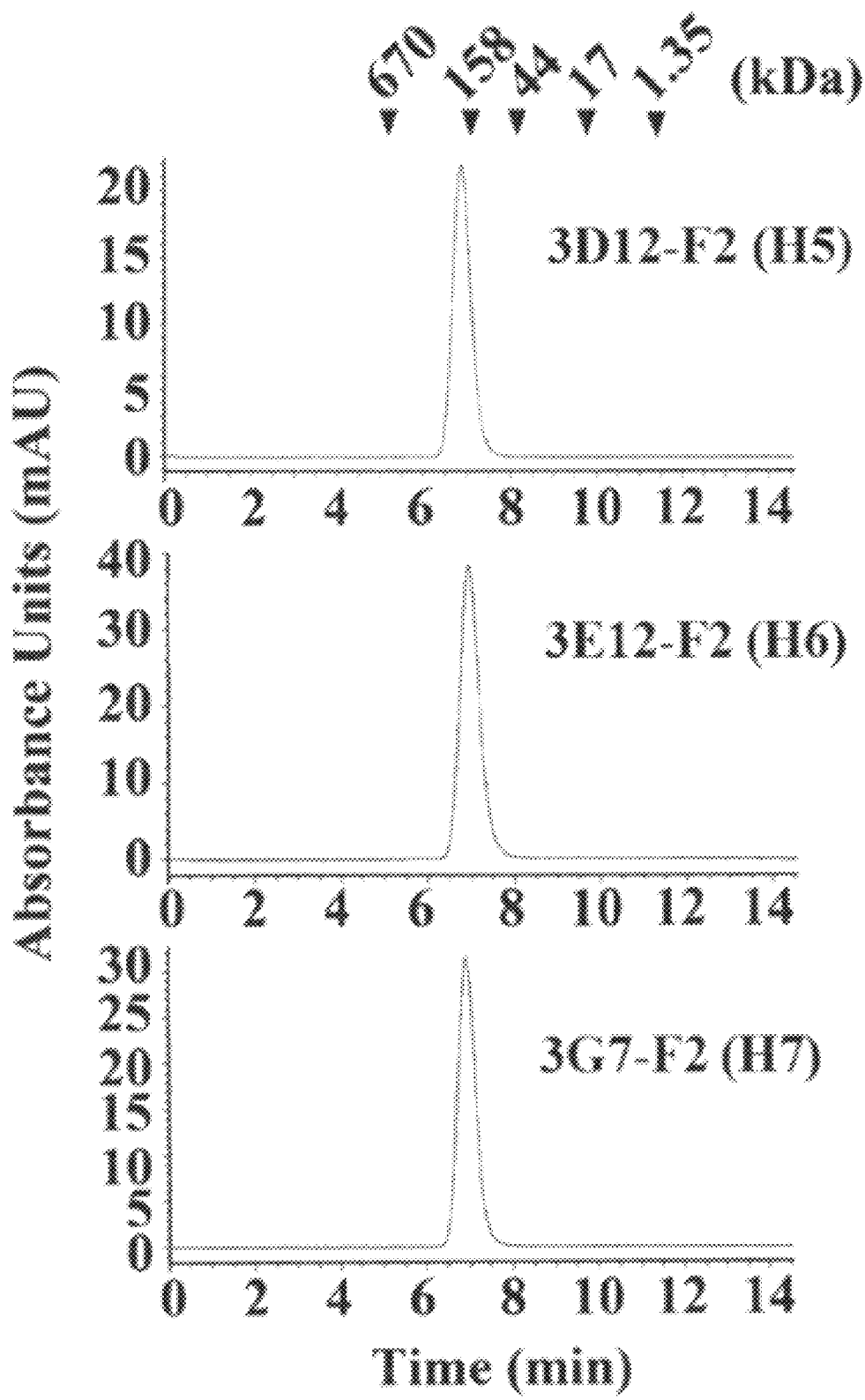

[FIG. 7]
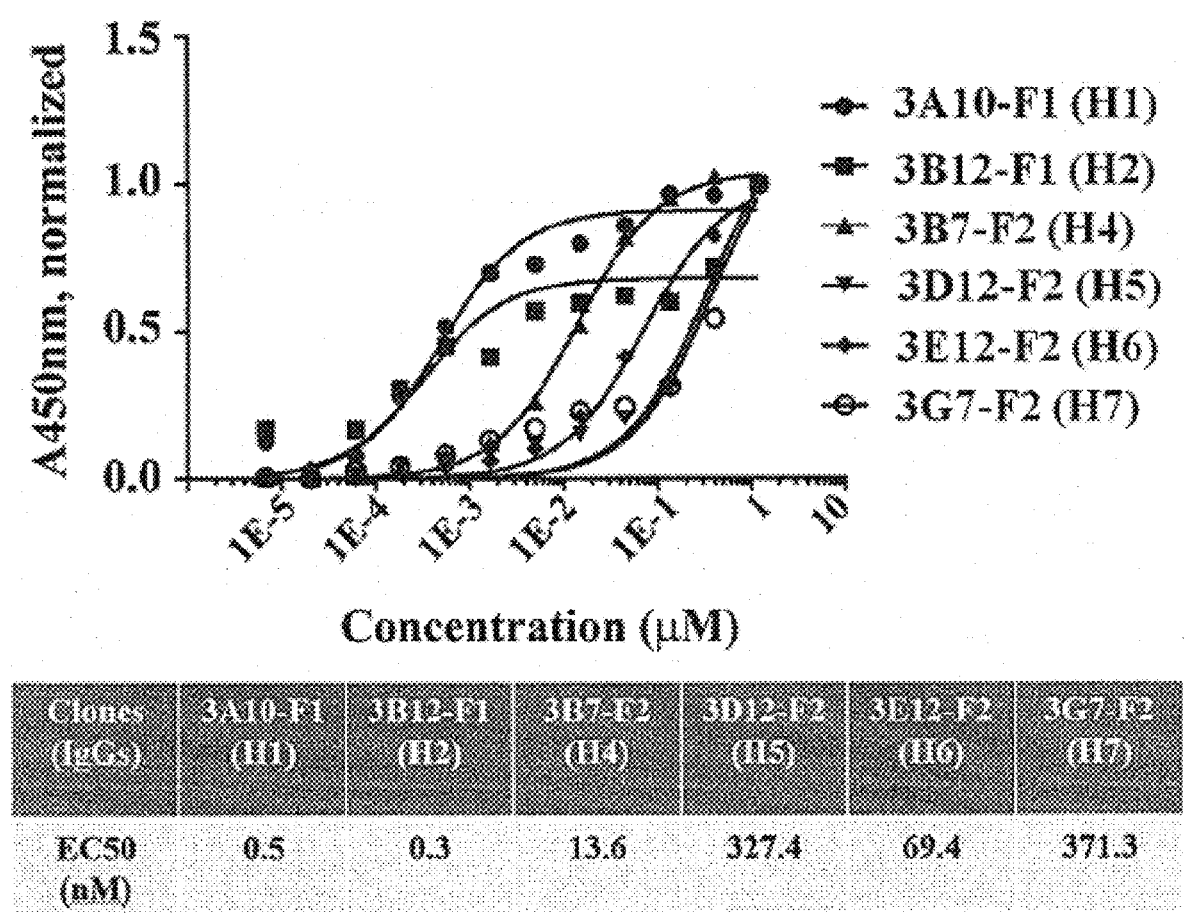

[FIG. 8a]
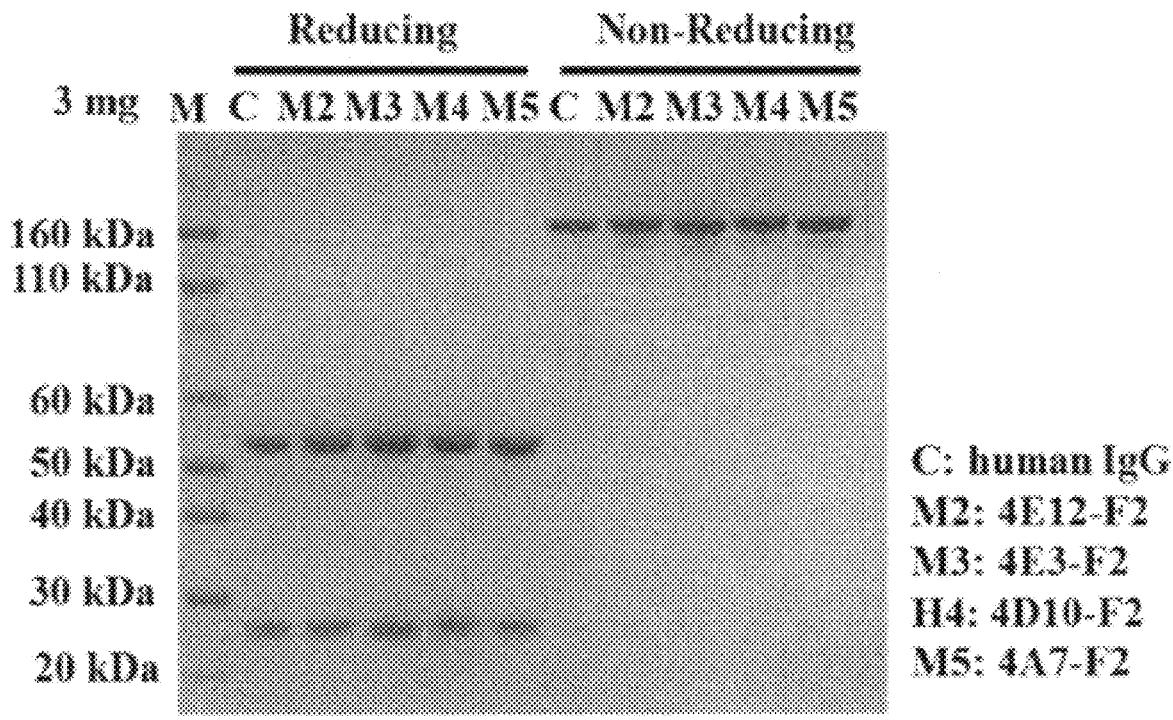
[FIG. 8b]
| Clones (IgGs) | Concentration (mg/mL) | Final volume (mL) | Final yield (mg) | Note |
|---|---|---|---|---|
| 4E12-F2 (M2) | 0.8 | 2 | 1.6 | Expi293 300 mL culture |
| 4E3-F2 (M3) | 1.8 | 2 | 3.6 | Expi293 300 mL culture |
| 4D10-F2 (M4) | 1.7 | 3.5 | 6.3 | Expi293 300 mL culture |
| 4A7-F2 (M5) | 0.7 | 1 | 0.7 | Expi293 300 mL culture |
* Final yield (mg) = concentration (mg/mL) x final volume (mL)

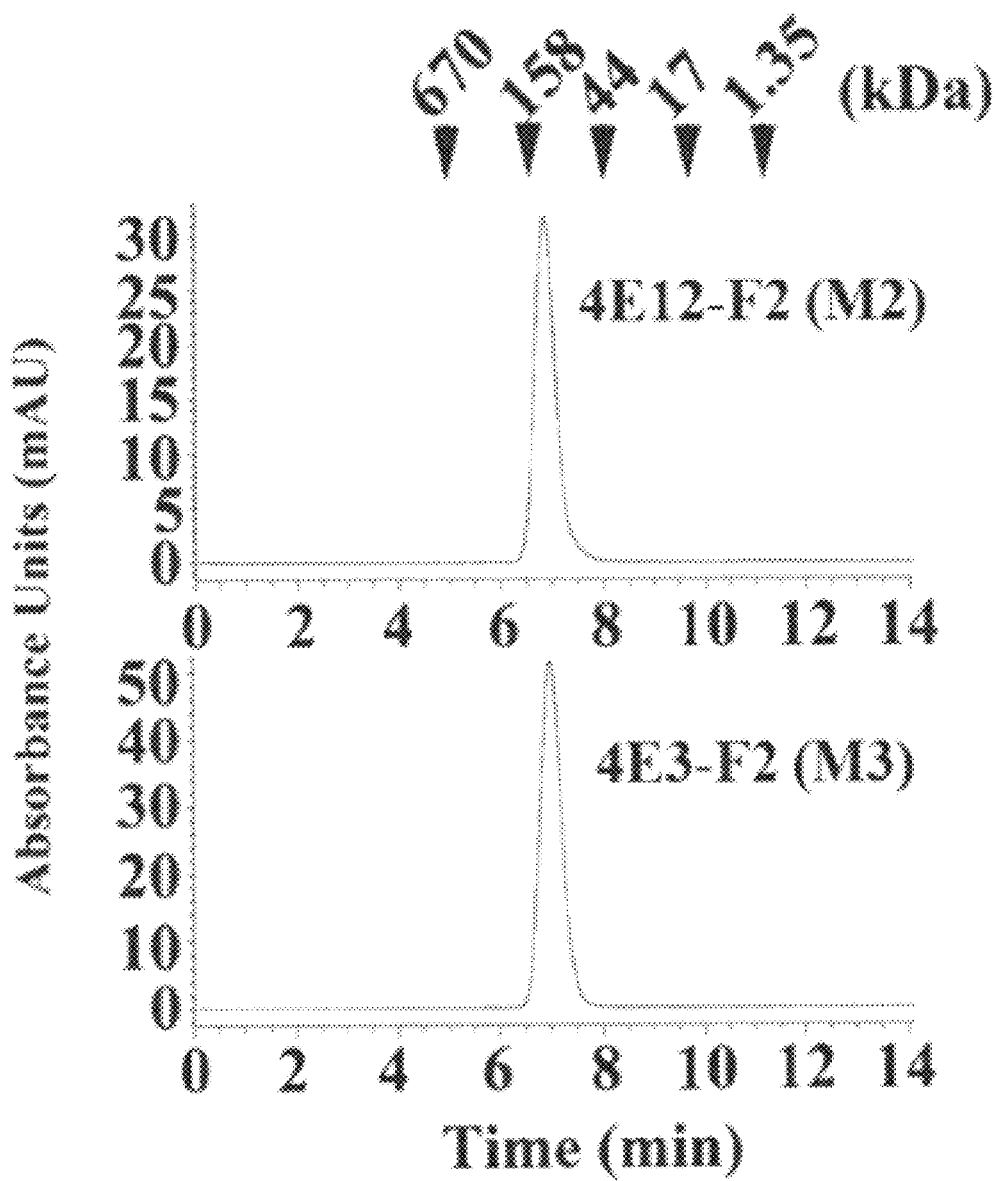
[FIG. 9a]

[FIG. 9b]
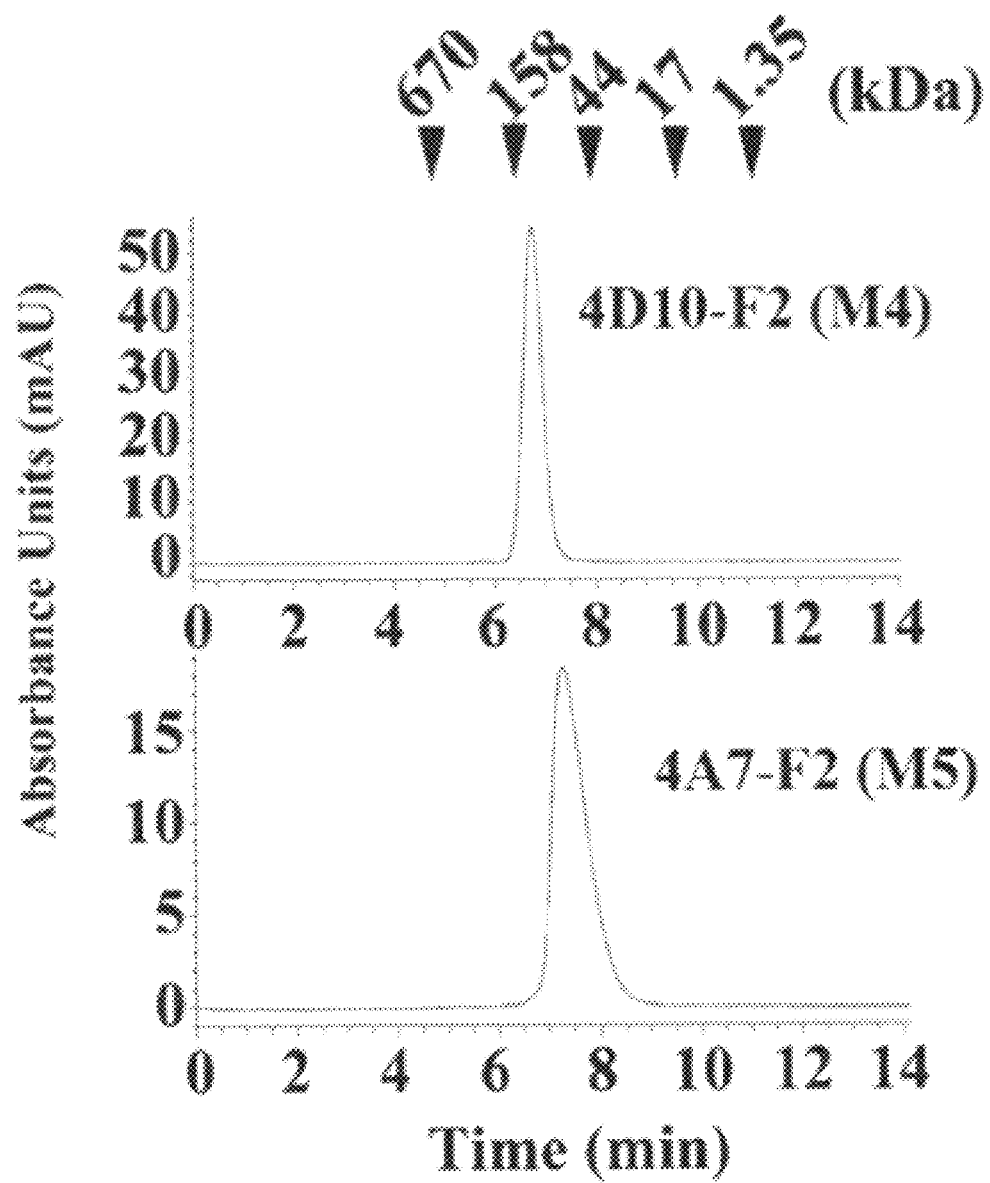

[FIG. 10]
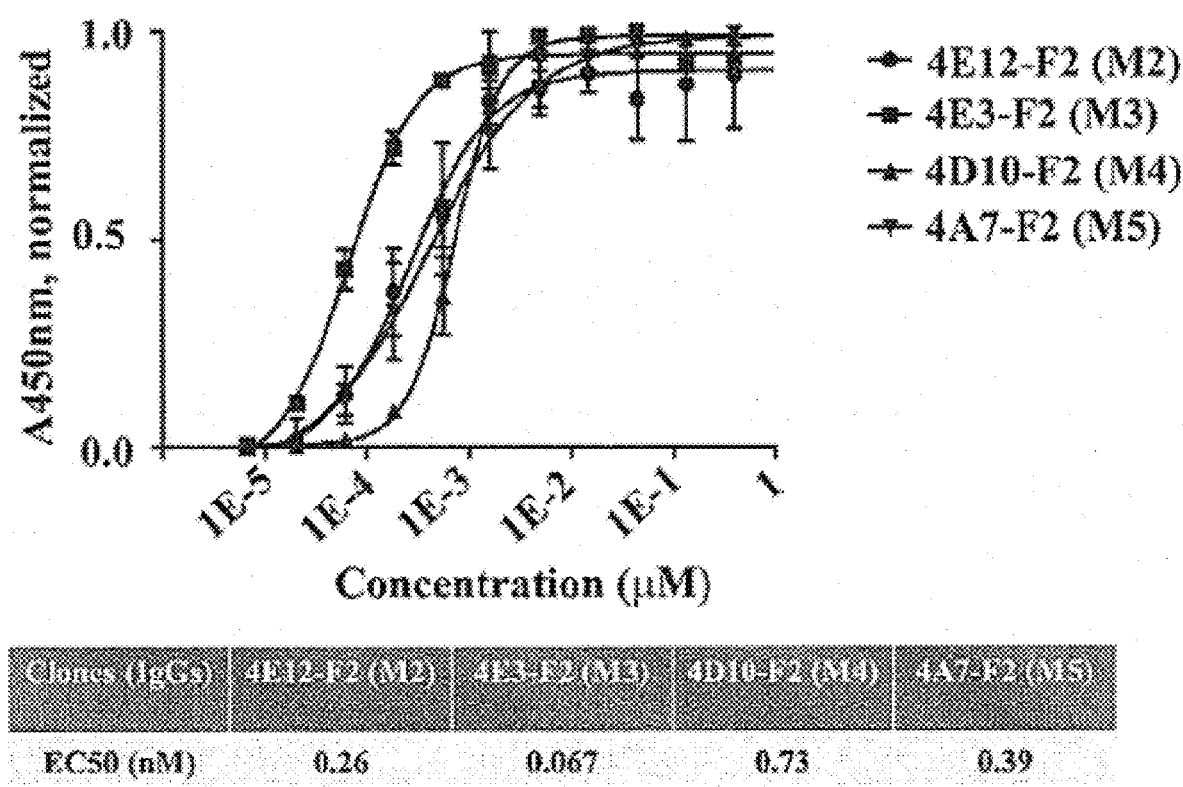

[FIG. 11a]
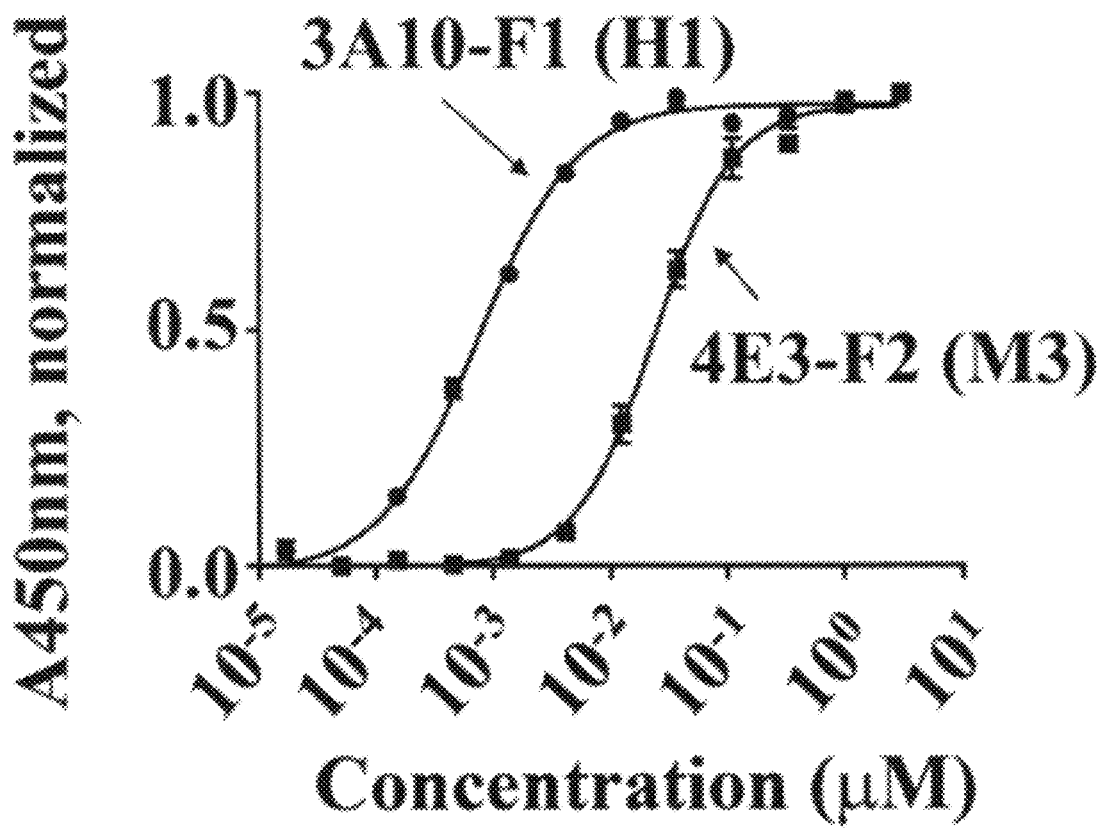

[FIG. 11b]
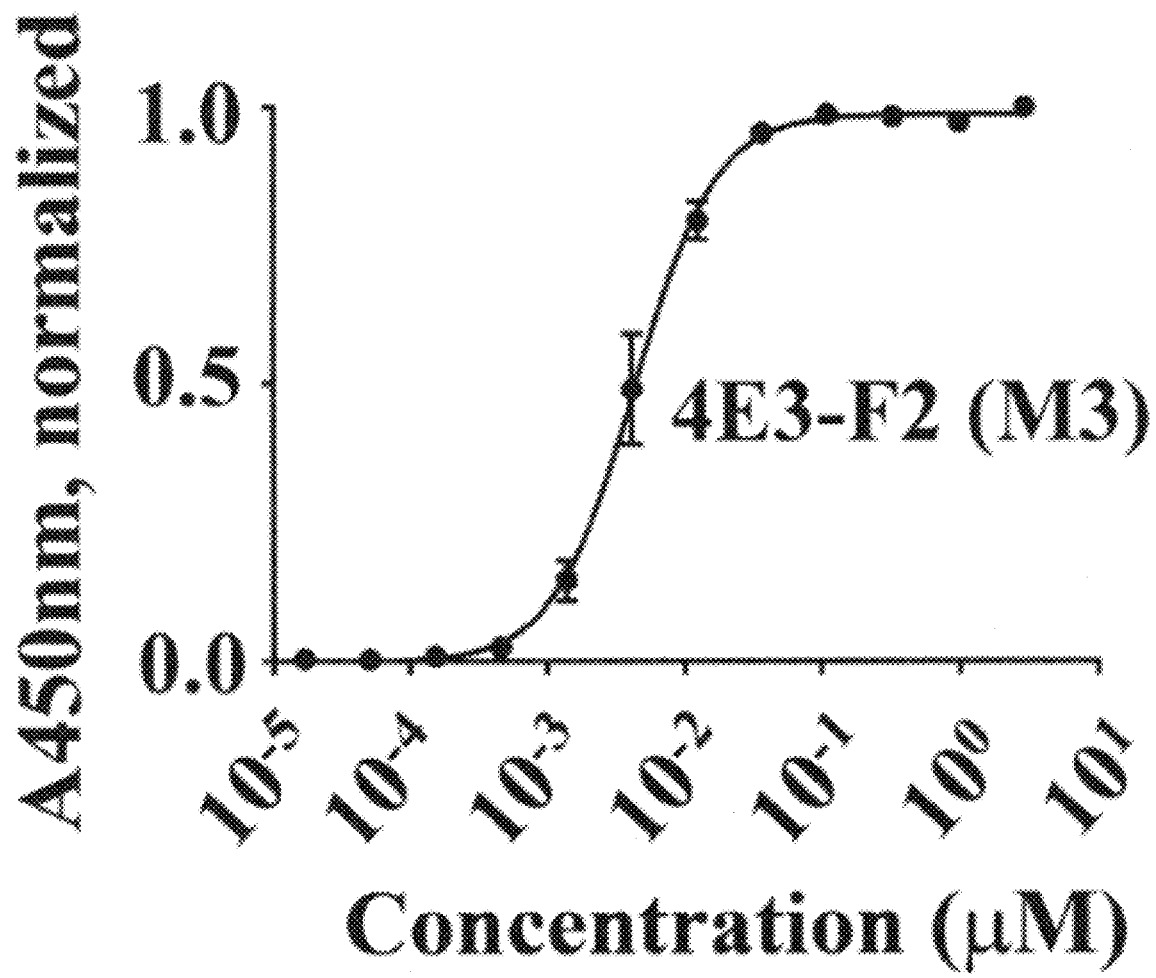

[FIG. 12a]
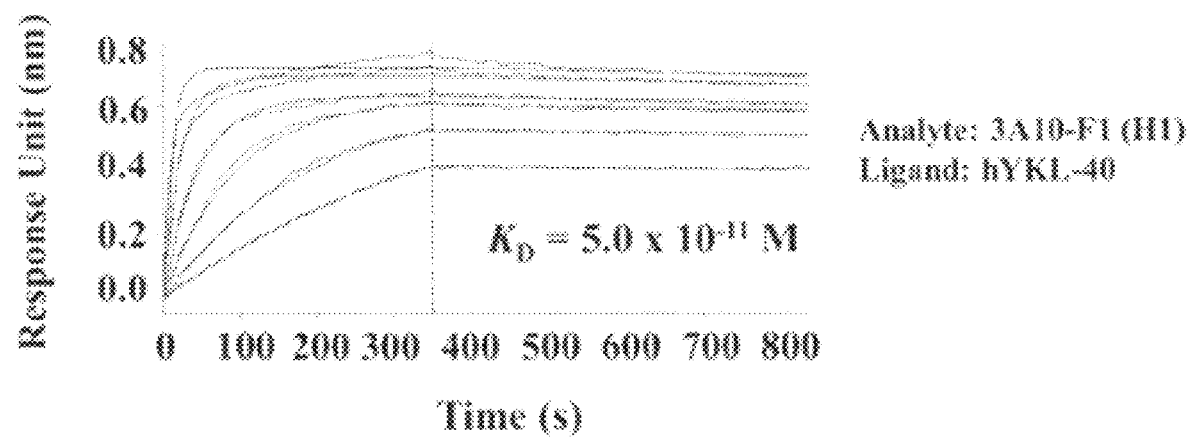
[FIG. 12b]
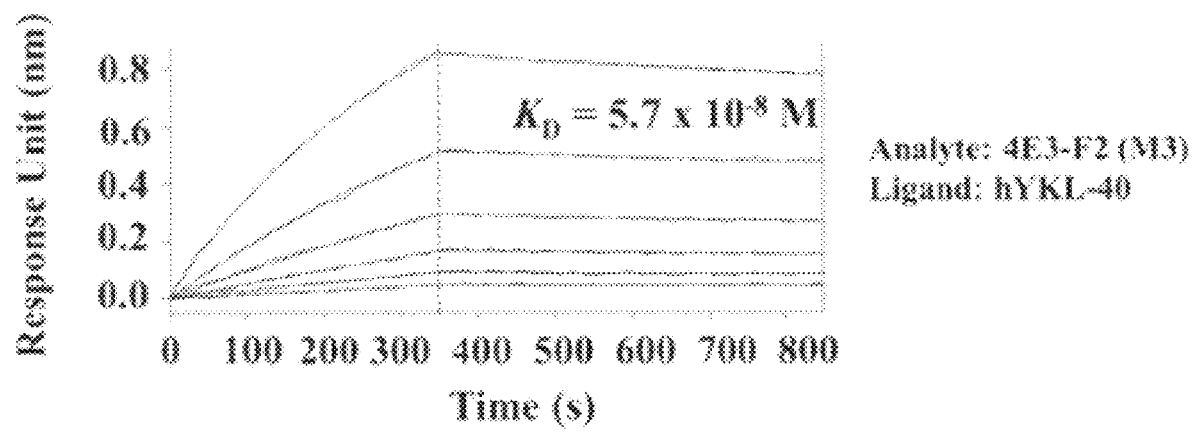

[FIG. 12c]
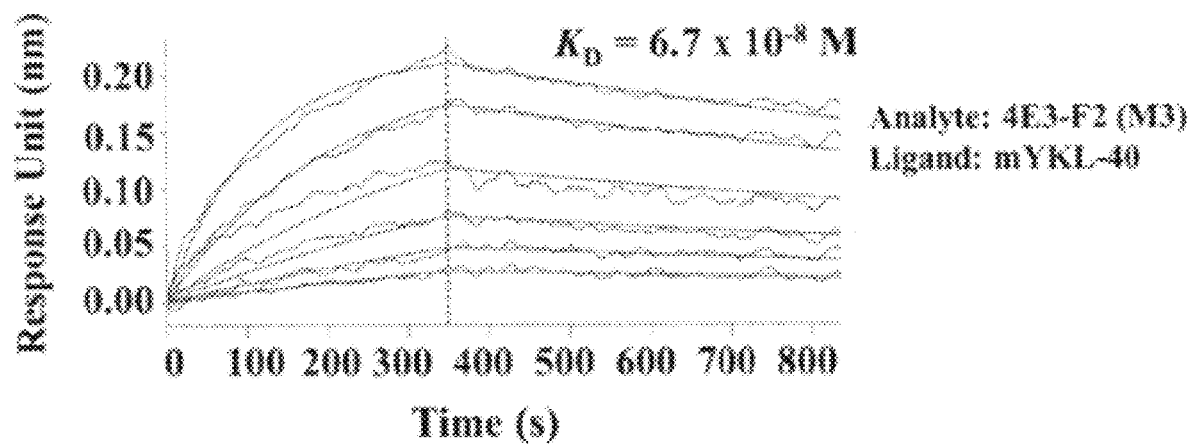
[FIG. 13a]
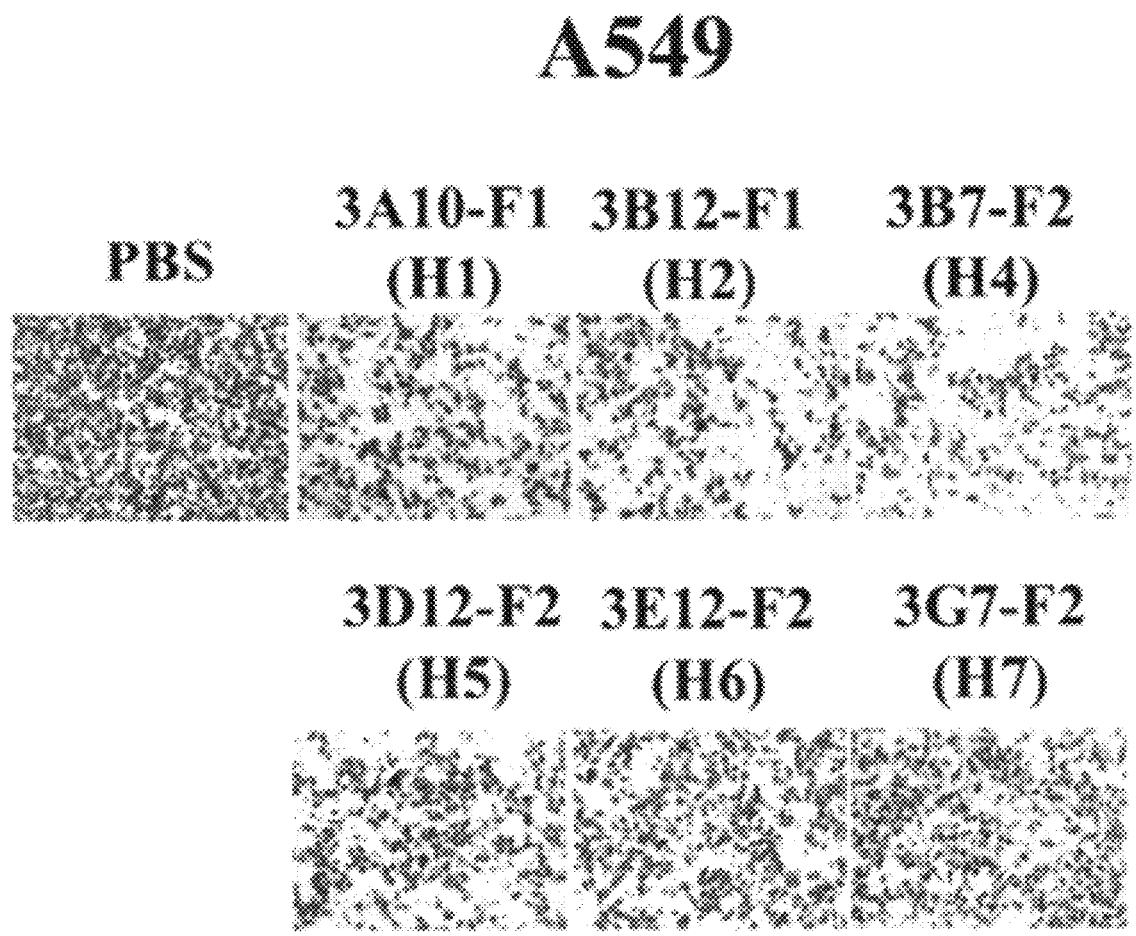

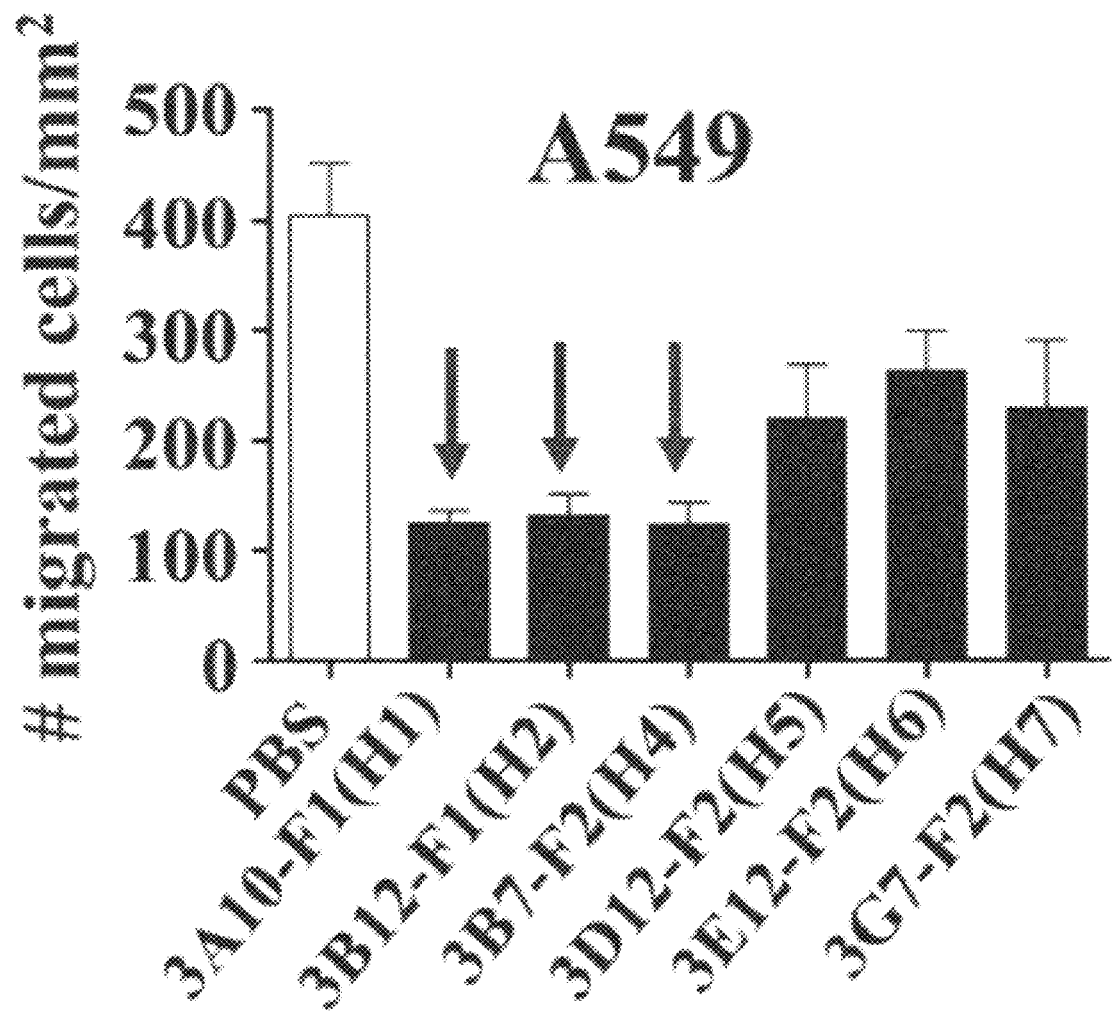
[FIG. 13b]

[FIG. 13c]
H460
| PBS | 3A10-F1 (H1) | 3B12-F1 (H2) | 3B7-F2 (H4) |
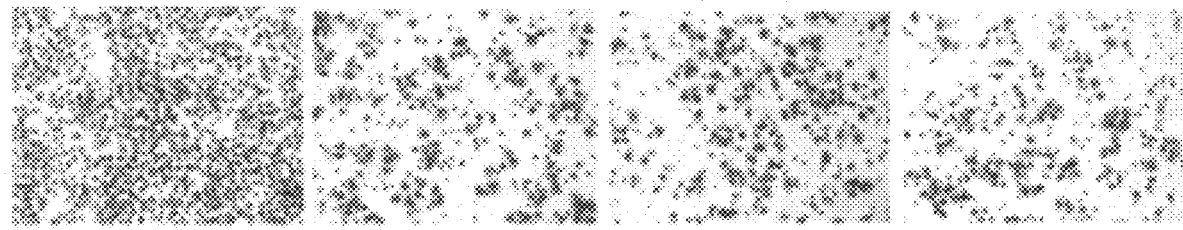
| | 3D12-F2 (H5) | 3E12-F2 (H6) | 3G7-F2 (H7) |
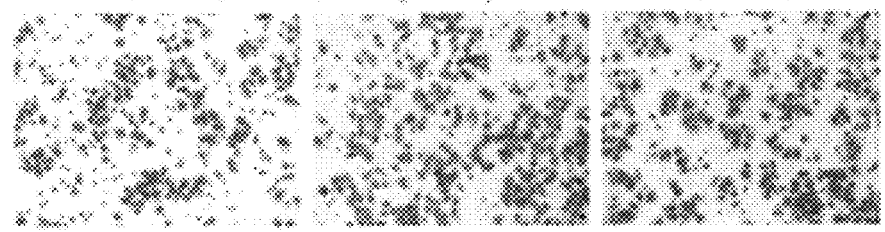

[FIG. 13d]
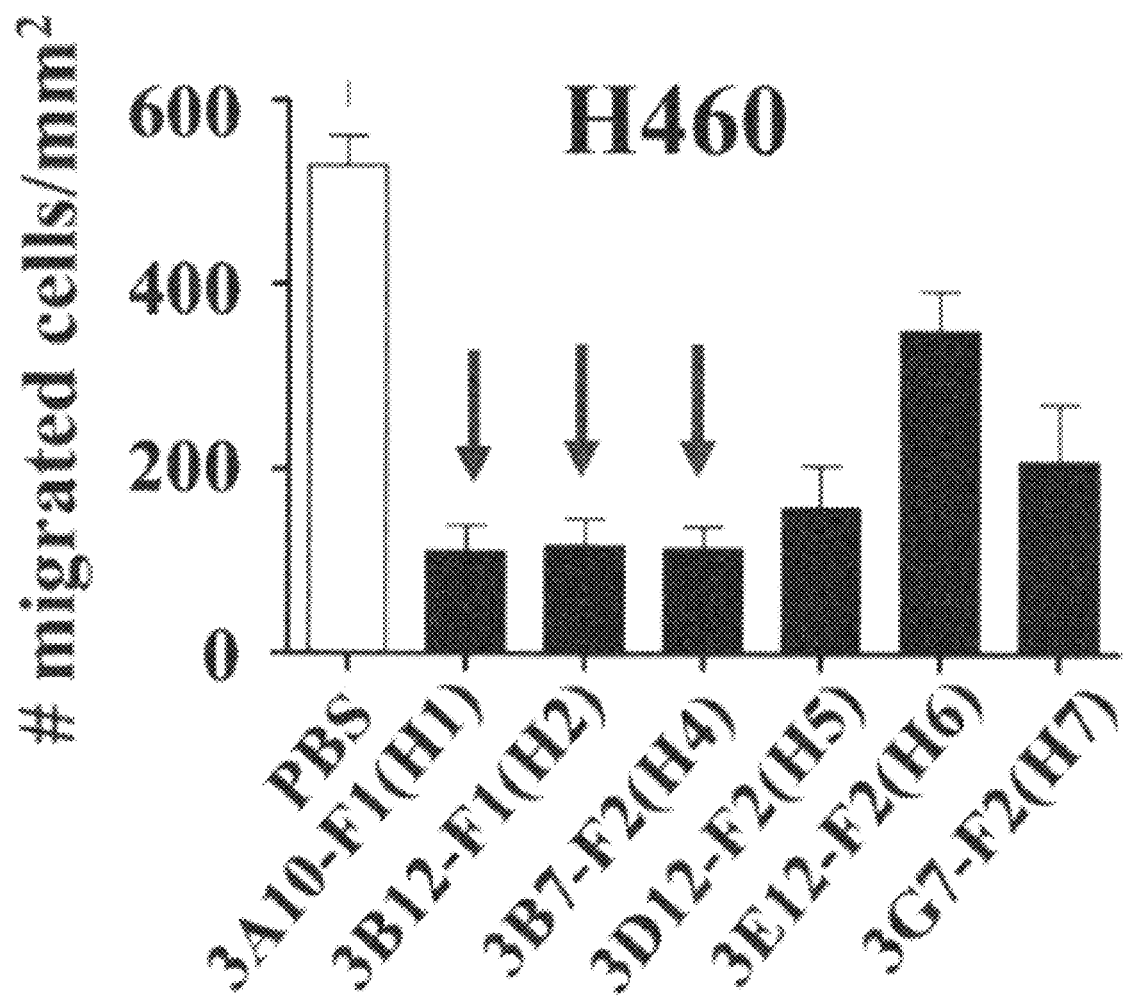

[FIG. 14a]
A549
PBS    4E12-F2 (M2)    4E3-F2 (M3)
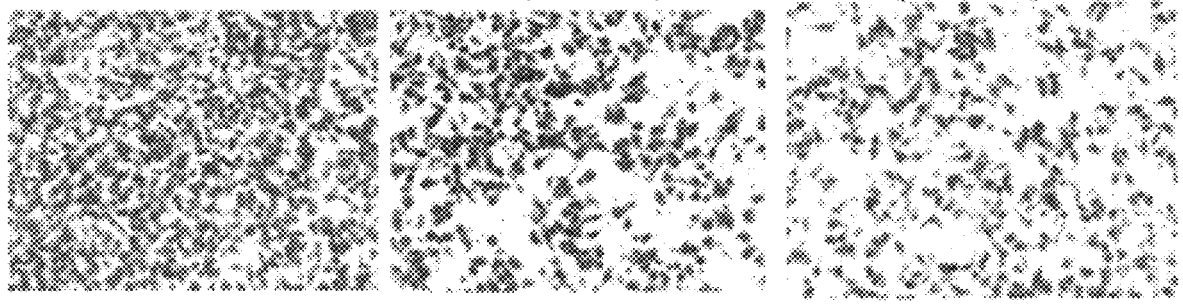
4D10-F2 (M4)    4A7-F2 (M5)
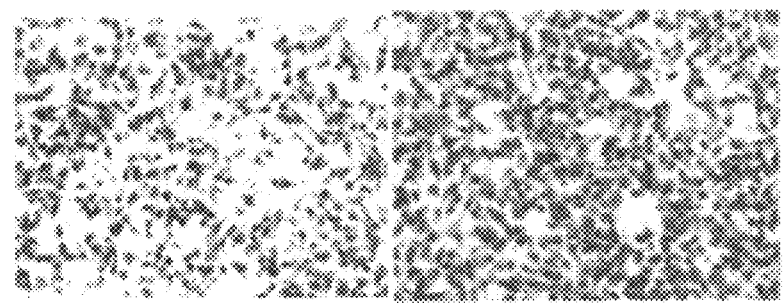

[FIG. 14b]
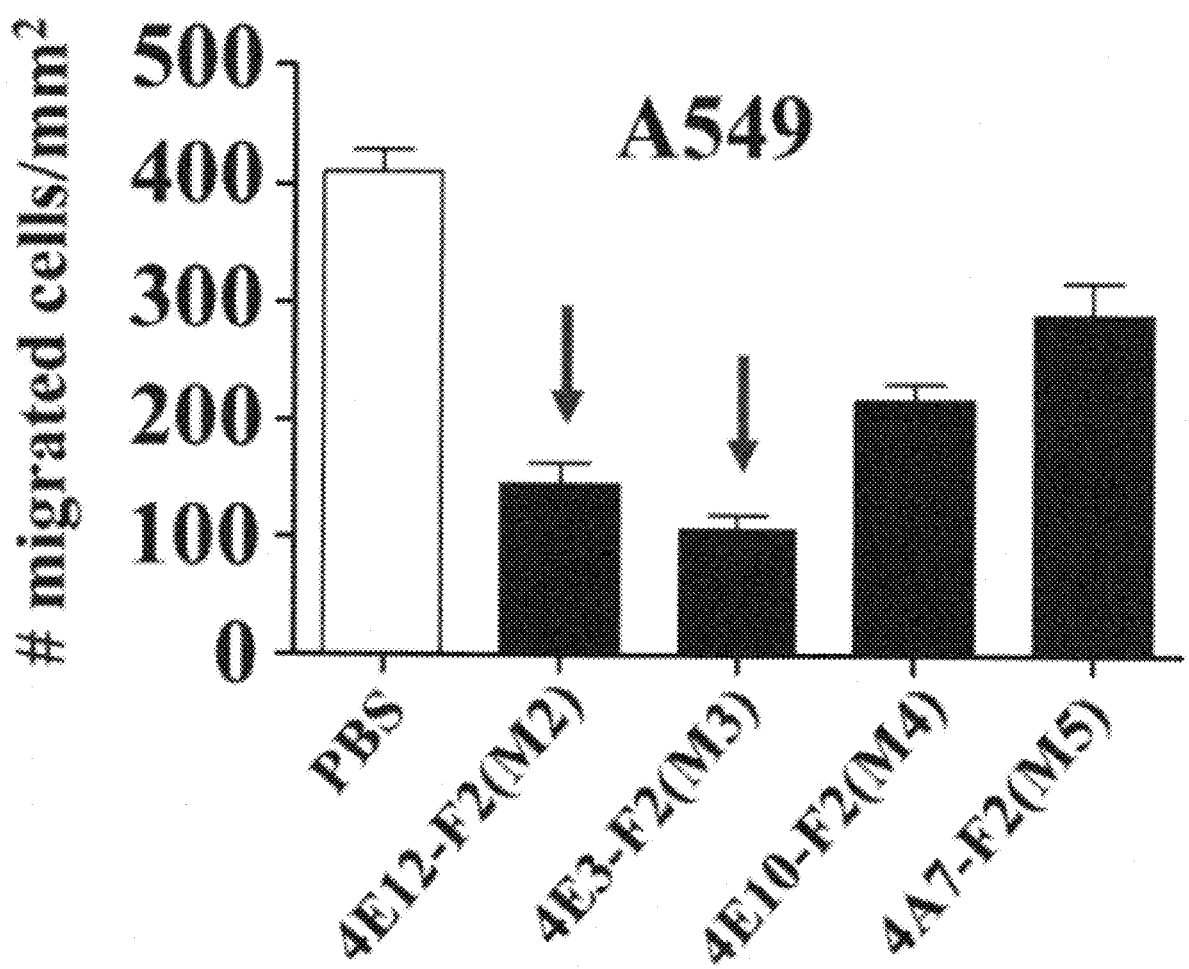

[FIG. 14c]
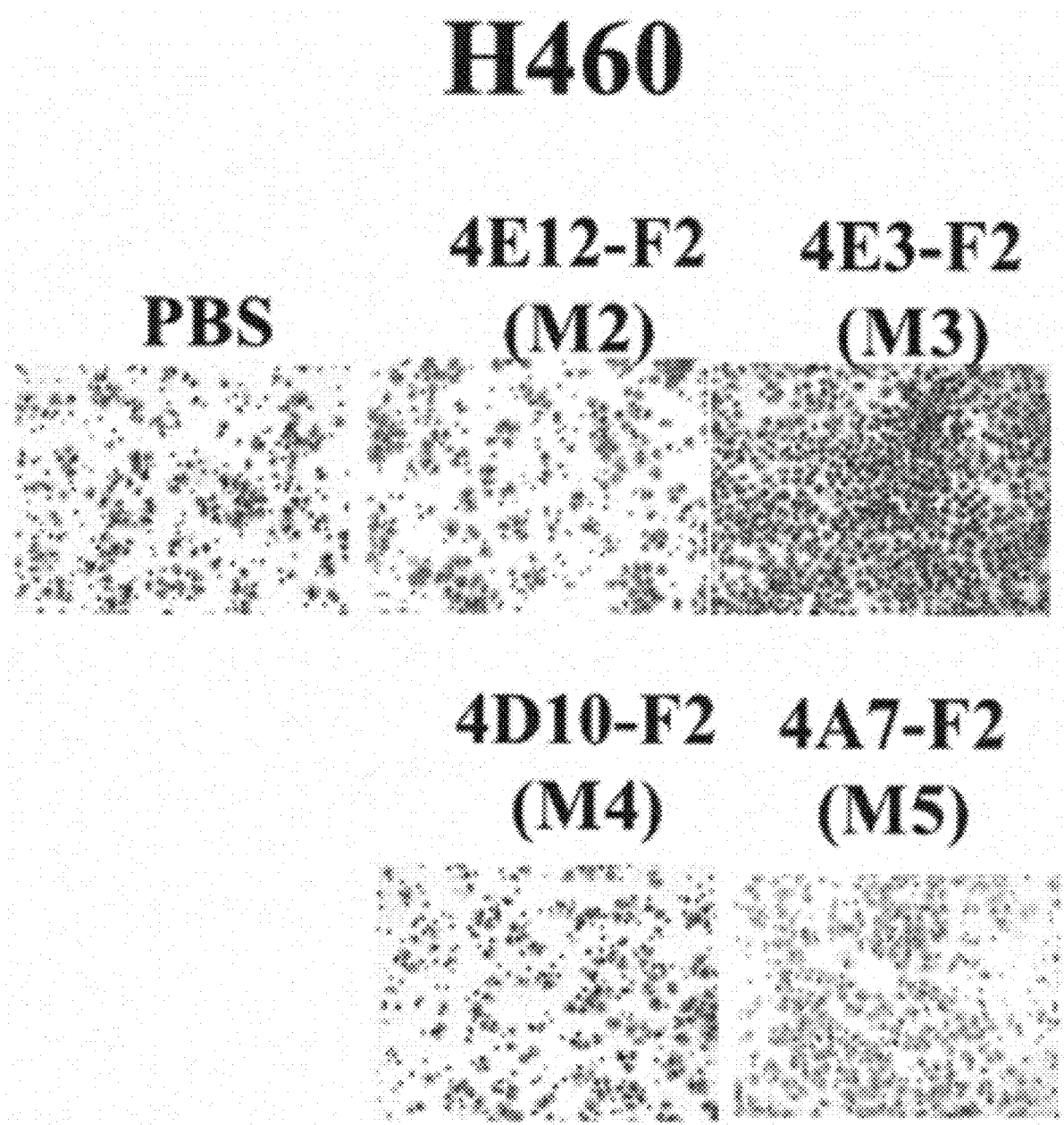

[FIG. 14d]
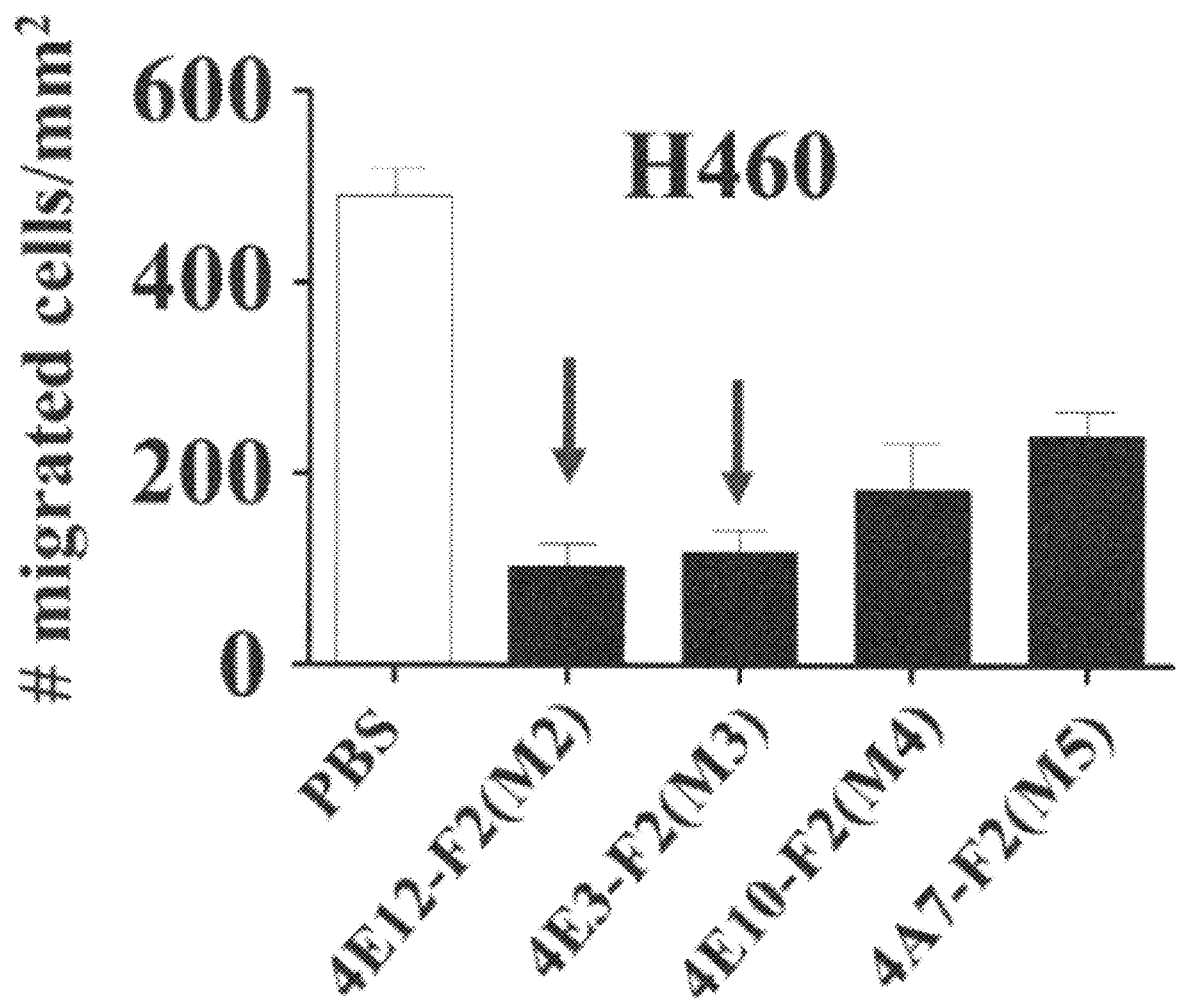

[FIG. 15a]
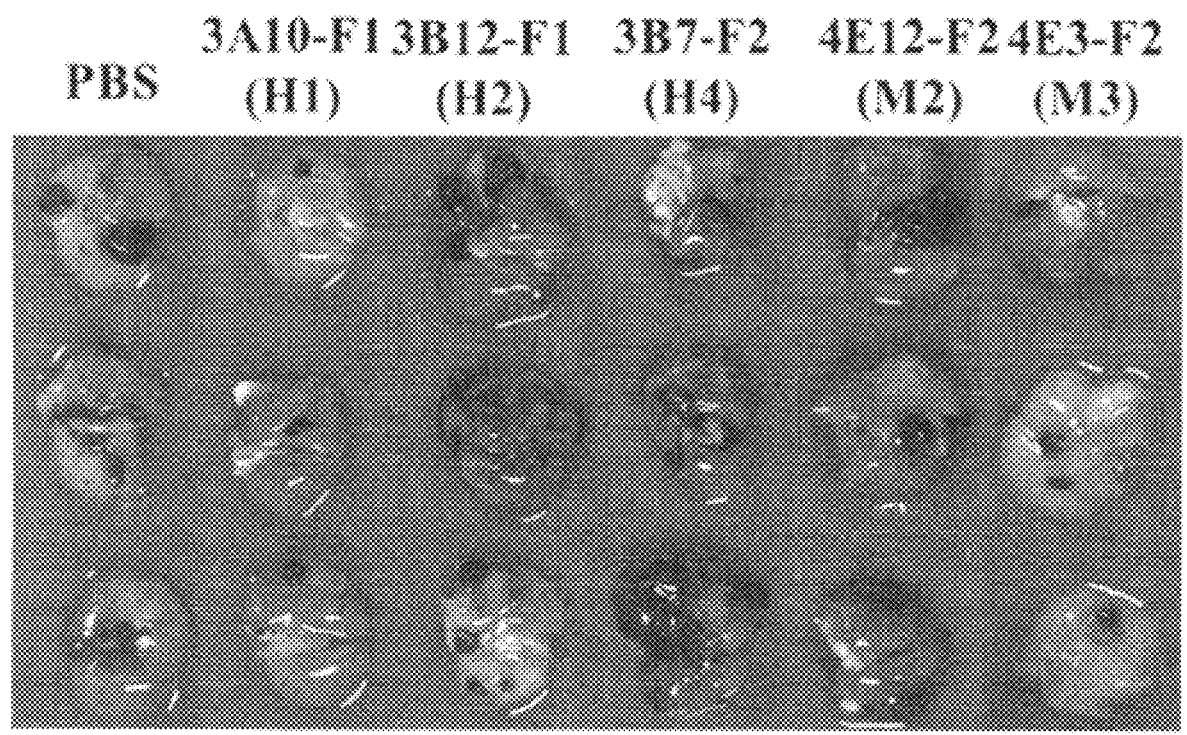

[FIG. 15b]
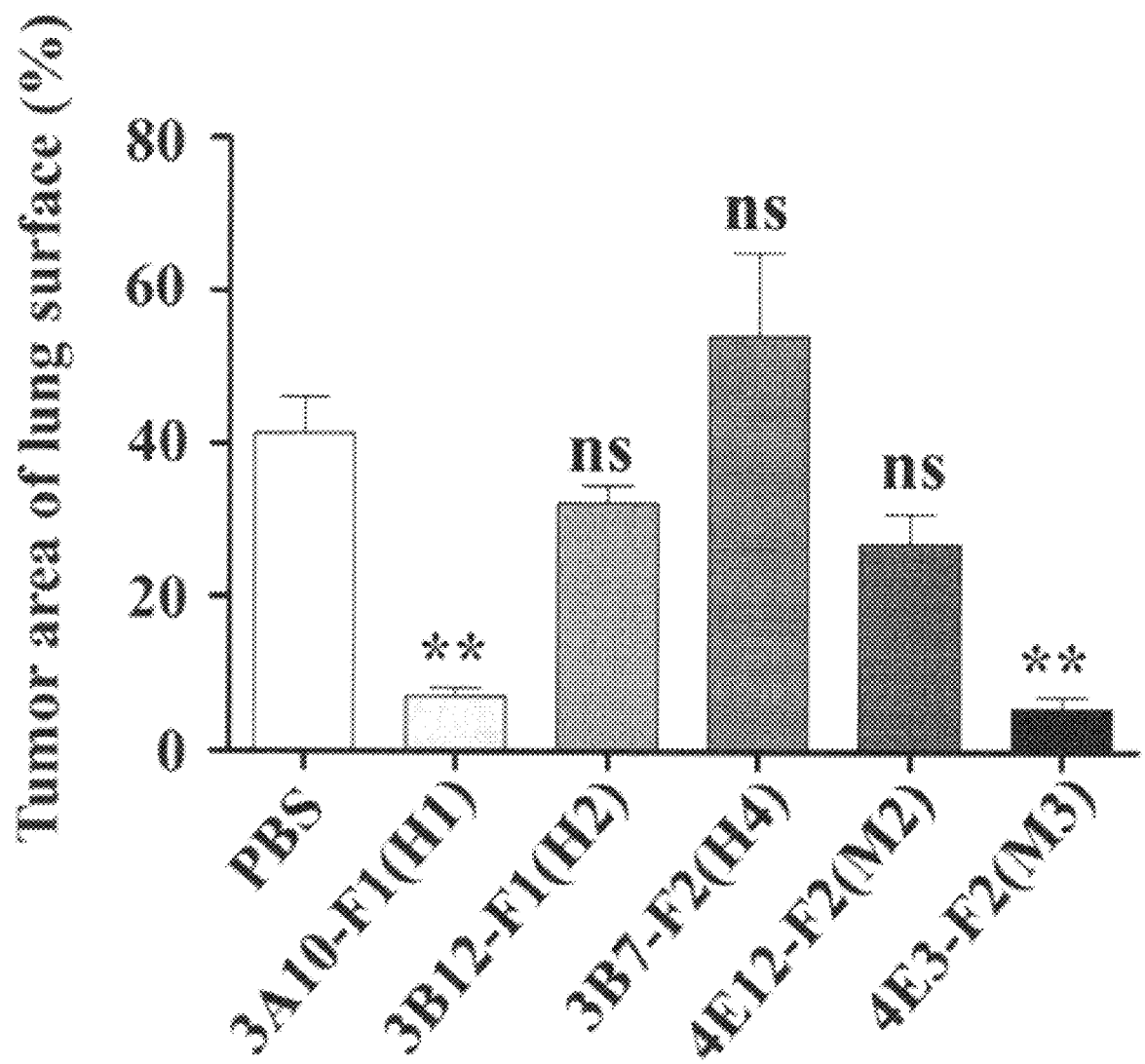

[FIG. 16a]
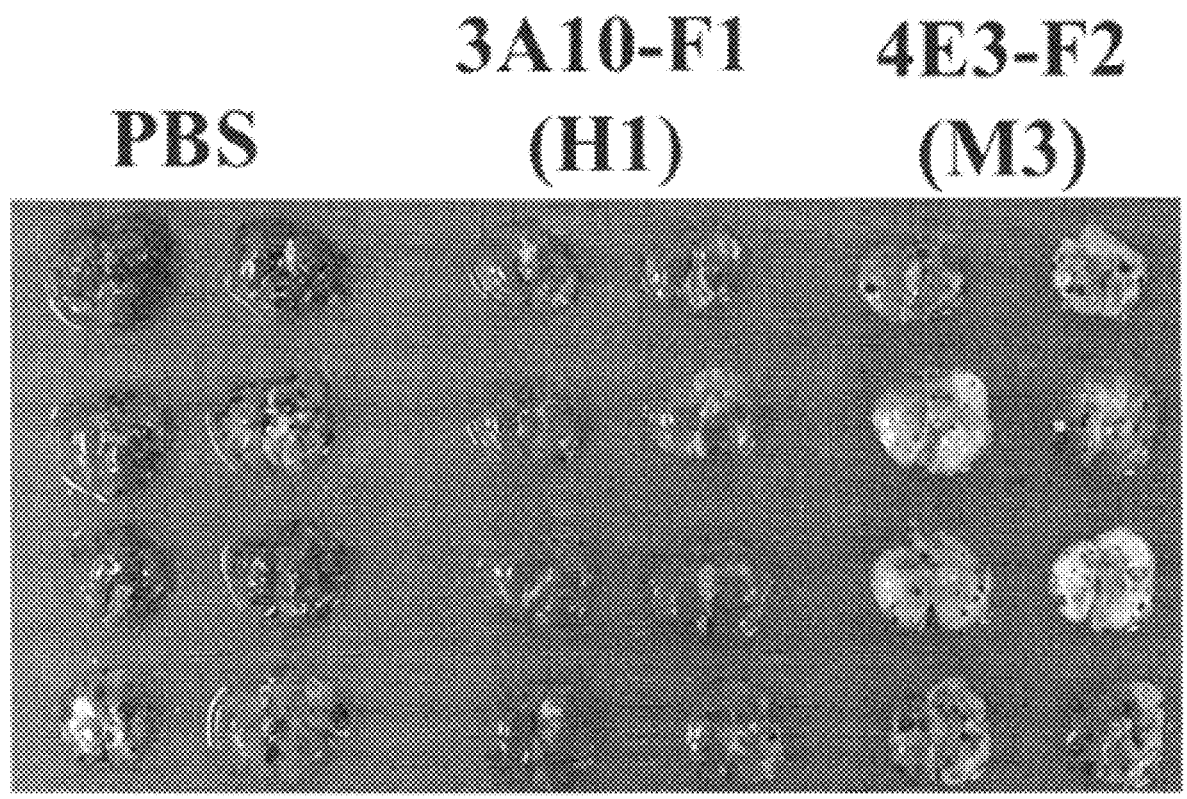

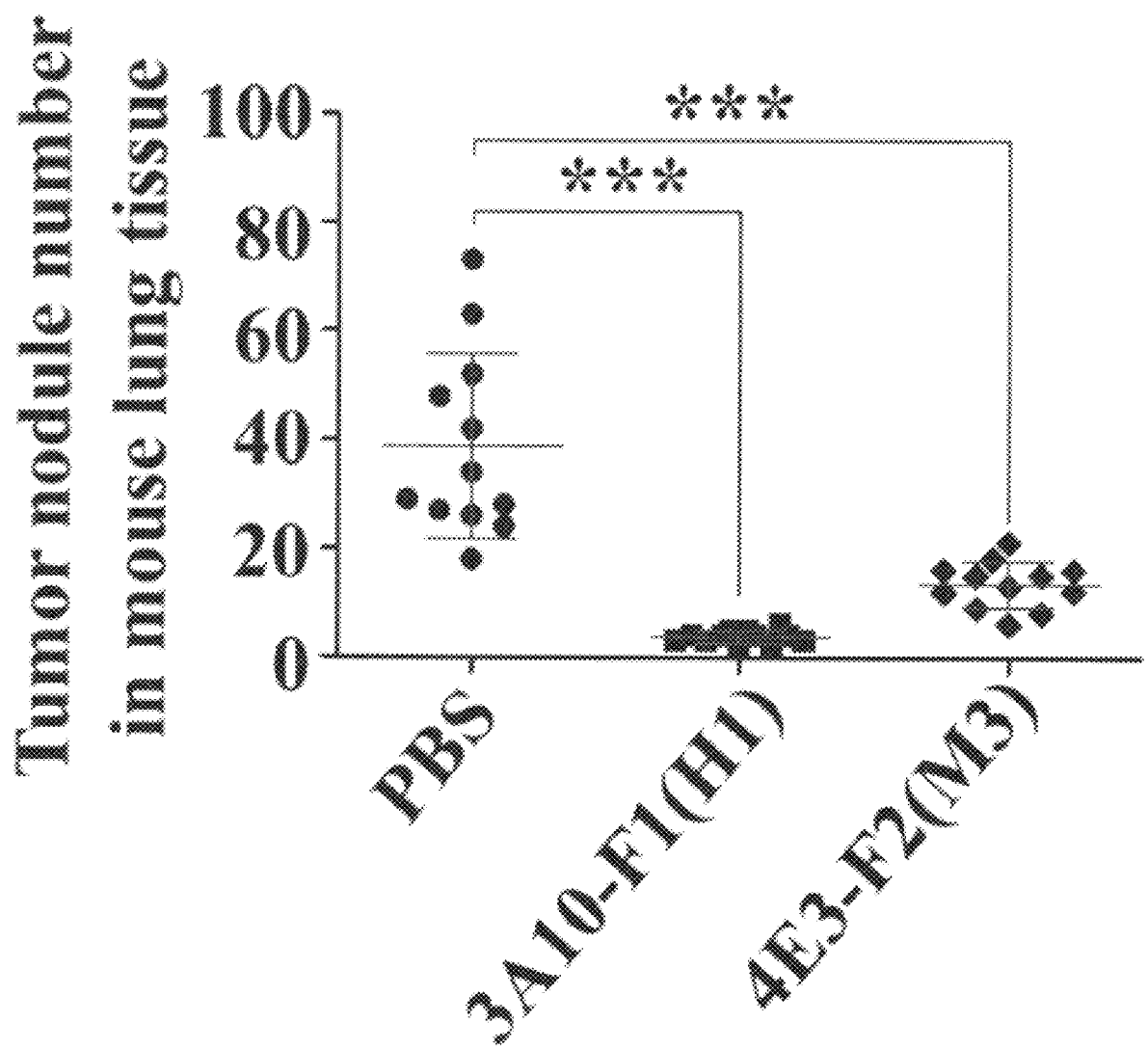
[FIG. 16b]

[FIG. 16c]
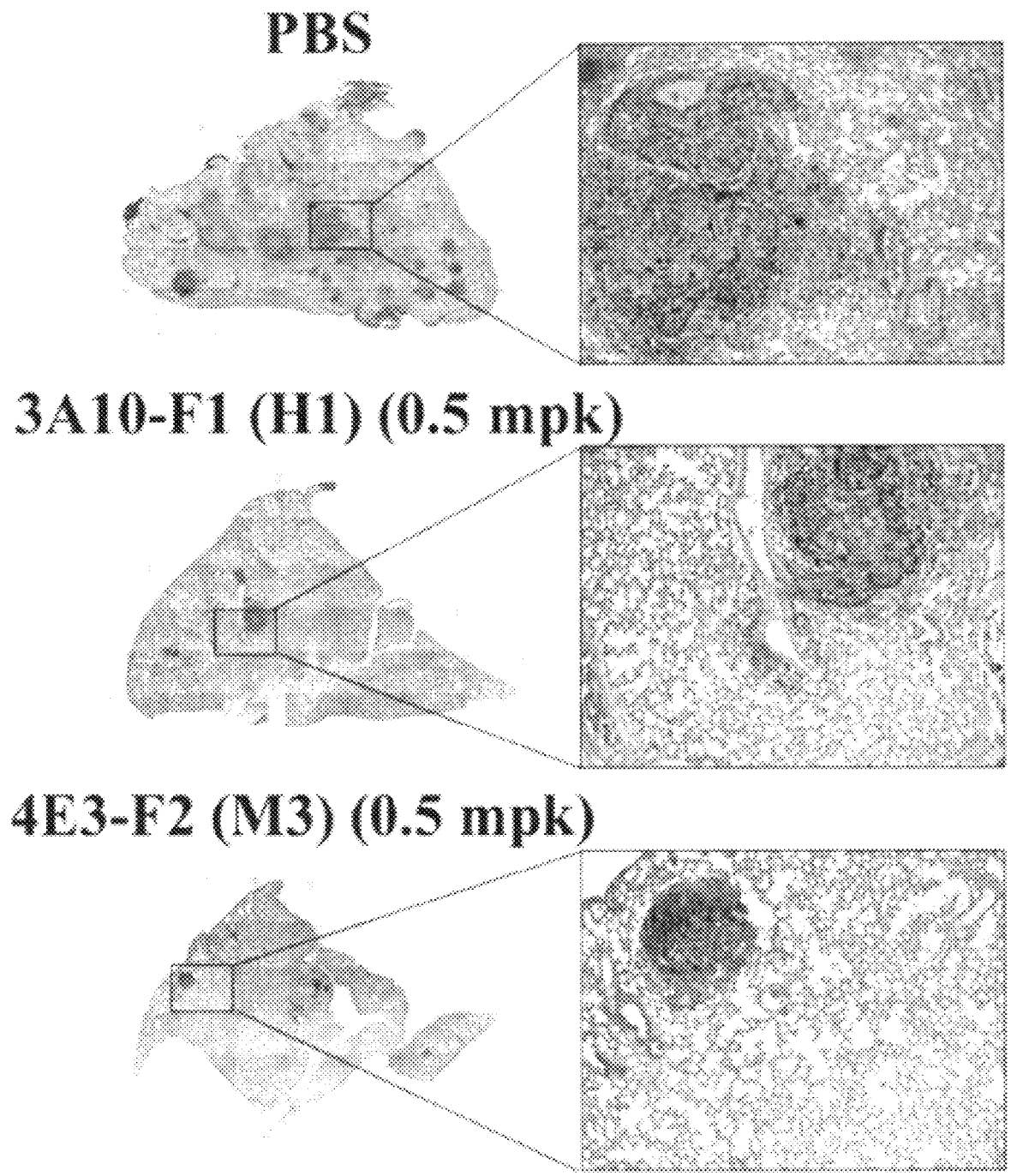

SEQUENCE LISTING

<160> NUMBER OF SEQ ID NOS: 32

<210> SEQ ID NO 1
<211> LENGTH: 115
<212> TYPE: PRT
<213> ORGANISM: Artificial Sequence
<220> FEATURE:
<223> OTHER INFORMATION: Heavy Chain of 3A10-F1 (H1)

<400> SEQUENCE: 1

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met Ser Trp Val Arg Gln Ala Pro Gly Lys Gly Leu Glu Trp Val
        35                  40                  45

Ser Gly Ile Ser Gly Ser Gly Gly Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Gly Val Gly Thr Phe Asp Val Trp Gly Gln Gly Thr Leu Val Thr
            100                 105                 110

Val Ser Ser
        115
```

<210> SEQ ID NO 2
<211> LENGTH: 121
<212> TYPE: PRT

-continued

```
<213> ORGANISM: Artificial Sequence
<220> FEATURE:
<223> OTHER INFORMATION: Heavy Chain of 4E3-F2 (M3)

<400> SEQUENCE: 2

Gln Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Ser Tyr
            20                  25                  30

Asp Ile His Trp Val Arg Gln Ala Pro Gly Gln Gly Leu Glu Trp Met
        35                  40                  45

Gly Ile Ile Ser Pro Tyr Leu Gly Ile Thr Ile Tyr Ala Gln Lys Phe
50                  55                  60

Gln Gly Arg Val Thr Ile Thr Ala Asp Glu Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Arg Tyr Phe Tyr Tyr Gly Ser Glu Ala Phe Asp Tyr Trp Gly
            100                 105                 110

Gln Gly Thr Leu Val Thr Val Ser Ser
        115                 120

<210> SEQ ID NO 3
<211> LENGTH: 107
<212> TYPE: PRT
<213> ORGANISM: Artificial Sequence
<220> FEATURE:
<223> OTHER INFORMATION: Light Chain of 3A10-F1 (H1)

<400> SEQUENCE: 3

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Thr Ile Ser Ser Trp
            20                  25                  30

Leu Asn Trp Tyr Gln Gln Lys Pro Gly Lys Ala Pro Lys Leu Leu Ile
        35                  40                  45

Tyr Ala Ala Ser Arg Leu Gln Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Leu
                85                  90                  95

Thr Phe Gly Gln Gly Thr Lys Val Glu Ile Lys
            100                 105

<210> SEQ ID NO 4
<211> LENGTH: 107
<212> TYPE: PRT
<213> ORGANISM: Artificial Sequence
<220> FEATURE:
<223> OTHER INFORMATION: Light Chain of 4E3-F2 (M3)

<400> SEQUENCE: 4

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Asn Tyr
            20                  25                  30

Leu Asn Trp Tyr Gln Gln Lys Pro Gly Lys Ala Pro Lys Leu Leu Ile
        35                  40                  45
```

Tyr Ala Ala Ser Thr Leu Gln Ser Gly Val Pro Ser Arg Phe Ser Gly
            50                  55                  60

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Ser Tyr Ser Phe Pro Leu
                85                  90                  95

Thr Phe Gly Gln Gly Thr Lys Val Glu Ile Lys
            100                 105

<210> SEQ ID NO 5
<211> LENGTH: 5
<212> TYPE: PRT
<213> ORGANISM: Artificial Sequence
<220> FEATURE:
<223> OTHER INFORMATION: CDR1 of Heavy Chain 3A10-F1 (H1)

<400> SEQUENCE: 5

Asn Tyr Ala Met Ser
1               5

<210> SEQ ID NO 6
<211> LENGTH: 17
<212> TYPE: PRT
<213> ORGANISM: Artificial Sequence
<220> FEATURE:
<223> OTHER INFORMATION: CDR2 of Heavy Chain 3A10-F1 (H1)

<400> SEQUENCE: 6

Gly Ile Ser Gly Ser Gly Gly Thr Thr Tyr Tyr Ala Asp Ser Val Lys
1               5                   10                  15

Gly

<210> SEQ ID NO 7
<211> LENGTH: 6
<212> TYPE: PRT
<213> ORGANISM: Artificial Sequence
<220> FEATURE:
<223> OTHER INFORMATION: CDR3 of Heavy Chain 3A10-F1 (H1)

<400> SEQUENCE: 7

Val Gly Thr Phe Asp Val
1               5

<210> SEQ ID NO 8
<211> LENGTH: 5
<212> TYPE: PRT
<213> ORGANISM: Artificial Sequence
<220> FEATURE:
<223> OTHER INFORMATION: CDR1 of Heavy Chain 4E3-F2 (M3)

<400> SEQUENCE: 8

Ser Tyr Asp Ile His
1               5

<210> SEQ ID NO 9
<211> LENGTH: 17
<212> TYPE: PRT
<213> ORGANISM: Artificial Sequence
<220> FEATURE:
<223> OTHER INFORMATION: CDR2 of Heavy Chain 4E3-F2 (M3)

<400> SEQUENCE: 9

Ile Ile Ser Pro Tyr Leu Gly Ile Thr Ile Tyr Ala Gln Lys Phe Gln
1               5                   10                  15

Gly

<210> SEQ ID NO 10
<211> LENGTH: 12
<212> TYPE: PRT
<213> ORGANISM: Artificial Sequence
<220> FEATURE:
<223> OTHER INFORMATION: CDR3 of Heavy Chain 4E3-F2 (M3)

<400> SEQUENCE: 10

Arg Tyr Phe Tyr Tyr Gln Ser Glu Ala Phe Asp Tyr
1               5                   10

<210> SEQ ID NO 11
<211> LENGTH: 11
<212> TYPE: PRT
<213> ORGANISM: Artificial Sequence
<220> FEATURE:
<223> OTHER INFORMATION: CDR1 of Light Chain 3A10-F1 (H1)

<400> SEQUENCE: 11

Arg Ala Ser Gln Thr Ile Ser Ser Trp Leu Asn
1               5                   10

<210> SEQ ID NO 12
<211> LENGTH: 7
<212> TYPE: PRT
<213> ORGANISM: Artificial Sequence
<220> FEATURE:
<223> OTHER INFORMATION: CDR2 of Light Chain 3A10-F1 (H1)

<400> SEQUENCE: 12

Ala Ala Ser Arg Leu Gln Ser
1               5

<210> SEQ ID NO 13
<211> LENGTH: 9
<212> TYPE: PRT
<213> ORGANISM: Artificial Sequence
<220> FEATURE:
<223> OTHER INFORMATION: CDR3 of Light Chain 3A10-F1 (H1)

<400> SEQUENCE: 13

Gln Gln Ser Tyr Ser Thr Pro Leu Thr
1               5

<210> SEQ ID NO 14
<211> LENGTH: 11
<212> TYPE: PRT
<213> ORGANISM: Artificial Sequence
<220> FEATURE:
<223> OTHER INFORMATION: CDR1 of Light Chain 4E3-F2 (M3)

<400> SEQUENCE: 14

Arg Ala Ser Gln Ser Ile Ser Asn Tyr Leu Asn
1               5                   10

<210> SEQ ID NO 15
<211> LENGTH: 7
<212> TYPE: PRT
<213> ORGANISM: Artificial Sequence
<220> FEATURE:
<223> OTHER INFORMATION: CDR2 of Light Chain 4E3-F2 (M3)

<400> SEQUENCE: 15

Ala Ala Ser Thr Leu Gln Ser

<210> SEQ ID NO 16
<211> LENGTH: 9
<212> TYPE: PRT
<213> ORGANISM: Artificial Sequence
<220> FEATURE:
<223> OTHER INFORMATION: CDR3 of Light Chain 4E3-F2 (M3)

<400> SEQUENCE: 16

Gln Gln Ser Tyr Ser Phe Pro Leu Thr
1               5

<210> SEQ ID NO 17
<211> LENGTH: 345
<212> TYPE: DNA
<213> ORGANISM: Artificial Sequence
<220> FEATURE:
<223> OTHER INFORMATION: Heavy Chain of 3A10-F1 (H1)

<400> SEQUENCE: 17
gaagtacagt tggtcgaaag tggcggtggc ctcgtgcaac cgggtggttc actgcgtctg      60
agctgcgccg cctcgggttt tactttctct aattatgcaa tgtcttgggt tcgtcaggcg     120
ccgggcaagg gtctcgaatg gtttcaggt atctctggtt ctggtggtac tacttactat     180
gccgattcag tgaagggtcg ctttaccatt tcccgtgaca actctaagaa tactctgtat     240
ctgcagatga actcgctgcg tgccgaagac acggccgtct attattgcgc cggtgttggt     300
actttcgatg tttggggtca gggcacttta gtgaccgtct catcg                    345

<210> SEQ ID NO 18
<211> LENGTH: 363
<212> TYPE: DNA
<213> ORGANISM: Artificial Sequence
<220> FEATURE:
<223> OTHER INFORMATION: Heavy Chain of 4E3-F2 (M3)

<400> SEQUENCE: 18
caagttcagc tggtccagag cggcgcagag gtgaagaagc ccggcagttc tgttaaggtt      60
tcctgcaaag cctcaggcgg gacttttagt tcttacgata tccattgggt gcggcaggcg     120
cccggccagg gtctcgaatg gatggggatc atttctccat acctgggtat caccatctat     180
gcacaaaaat tccaaggccg cgtaactatt accgccgacg aatcaacctc caccgcctac     240
atggaactca gctctctgag gtcagaagac acggccgtct attattgcgc cagacgttac     300
ttctactacc agtctgaagc attcgattac tggggtcagg gtactctggt taccgtctca     360
tcg                                                                   363

<210> SEQ ID NO 19
<211> LENGTH: 321
<212> TYPE: DNA
<213> ORGANISM: Artificial Sequence
<220> FEATURE:
<223> OTHER INFORMATION: Light Chain of 3A10-F1 (H1)

<400> SEQUENCE: 19
gacattcaaa tgacgcagag tcctcctca ctgagtgcta gcgtgggcga tcgtgtgaca       60
attacttgtc gcgctagcca gactatctct tcttggctga actggtatca gcagaaaccg     120
ggcaaggcgc caaaattgct gatttacgca gcatcccgtc tgcagtctgg tgtaccgtcc     180
cgtttctctg gcagcggttc tggtacggat tttaccctga ccatctcaag cctccagcct     240

```
gaagattttg ccacctatta ttgtcagcaa tcttactcta ctccgctgac gttcgggcag    300
ggaactaaag tggaaattaa a                                              321
```

<210> SEQ ID NO 20
<211> LENGTH: 321
<212> TYPE: DNA
<213> ORGANISM: Artificial Sequence
<220> FEATURE:
<223> OTHER INFORMATION: Light Chain of 4E3-F2 (M3)

<400> SEQUENCE: 20

```
gacattcaaa tgacgcagag tccctcctca ctgagtgcta gcgtgggcga tcgtgtgaca    60
attacttgtc gcgctagcca gtctatctct aattacctga actggtatca gcagaaaccg   120
ggcaaggcgc caaaattgct gatttacgca gcatccactc tgcagtctgg tgtaccgtcc   180
cgtttctctg gcagcggttc tggtacggat tttaccctga ccatctcaag cctccagcct   240
gaagattttg ccacctatta ttgtcagcaa tcttactctt tccgctgac gttcgggcag    300 ggaactaaag tggaaattaa a                                              321
```

<210> SEQ ID NO 21
<211> LENGTH: 15
<212> TYPE: DNA
<213> ORGANISM: Artificial Sequence
<220> FEATURE:
<223> OTHER INFORMATION: CDR1 of Heavy Chain 3A10-F1 (H1)

<400> SEQUENCE: 21

```
aattatgcaa tgtct                                                     15
```

<210> SEQ ID NO 22
<211> LENGTH: 51
<212> TYPE: DNA
<213> ORGANISM: Artificial Sequence
<220> FEATURE:
<223> OTHER INFORMATION: CDR2 of Heavy Chain 3A10-F1 (H1)

<400> SEQUENCE: 22

```
ggtatctctg gttctggtgg tactacttac tatgccgatt cagtgaaggg t             51
```

<210> SEQ ID NO 23
<211> LENGTH: 18
<212> TYPE: DNA
<213> ORGANISM: Artificial Sequence
<220> FEATURE:
<223> OTHER INFORMATION: CDR3 of Heavy Chain 3A10-F1 (H1)

<400> SEQUENCE: 23

```
gttggtactt tcgatgtt                                                  18
```

<210> SEQ ID NO 24
<211> LENGTH: 15
<212> TYPE: DNA
<213> ORGANISM: Artificial Sequence
<220> FEATURE:
<223> OTHER INFORMATION: CDR1 of Heavy Chain 4E3-F2 (M3)

<400> SEQUENCE: 24

```
tcttacgata tccat                                                     15
```

<210> SEQ ID NO 25
<211> LENGTH: 51
<212> TYPE: DNA
<213> ORGANISM: Artificial Sequence

```
<220> FEATURE:
<223> OTHER INFORMATION: CDR2 of Heavy Chain 4E3-F2 (M3)

<400> SEQUENCE: 25
atcatttctc catacctggg tatcaccatc tatgcacaaa aattccaagg c        51

<210> SEQ ID NO 26
<211> LENGTH: 36
<212> TYPE: DNA
<213> ORGANISM: Artificial Sequence
<220> FEATURE:
<223> OTHER INFORMATION: CDR3 of Heavy Chain 4E3-F2 (M3)

<400> SEQUENCE: 26
cgttacttct actaccagtc tgaagcattc gattac                         36

<210> SEQ ID NO 27
<211> LENGTH: 33
<212> TYPE: DNA
<213> ORGANISM: Artificial Sequence
<220> FEATURE:
<223> OTHER INFORMATION: CDR1 of  Light chain 3A10-F1 (H1)

<400> SEQUENCE: 27
cgcgctagcc agactatctc ttcttggctg aac                            33

<210> SEQ ID NO 28
<211> LENGTH: 21
<212> TYPE: DNA
<213> ORGANISM: Artificial Sequence
<220> FEATURE:
<223> OTHER INFORMATION: CDR2 of  Light chain 3A10-F1 (H1)

<400> SEQUENCE: 28
gcagcatccc gtctgcagtc t                                         21

<210> SEQ ID NO 29
<211> LENGTH: 27
<212> TYPE: DNA
<213> ORGANISM: Artificial Sequence
<220> FEATURE:
<223> OTHER INFORMATION: CDR3 of  Light Chain 3A10-F1 (H1)

<400> SEQUENCE: 29
cagcaatctt actctactcc gctgacg                                   27

<210> SEQ ID NO 30
<211> LENGTH: 33
<212> TYPE: DNA
<213> ORGANISM: Artificial Sequence
<220> FEATURE:
<223> OTHER INFORMATION: CDR1 of  Light Chain 4E3-F2 (M3)

<400> SEQUENCE: 30
cgcgctagcc agtctatctc taattacctg aac                            33

<210> SEQ ID NO 31
<211> LENGTH: 21
<212> TYPE: DNA
<213> ORGANISM: Artificial Sequence
<220> FEATURE:
<223> OTHER INFORMATION: CDR2 of  Light Chain 4E3-F2 (M3)

<400> SEQUENCE: 31
gcagcatcca ctctgcagtc t                                         21
```

```
<210> SEQ ID NO 32
<211> LENGTH: 27
<212> TYPE: DNA
<213> ORGANISM: Artificial Sequence
<220> FEATURE:
<223> OTHER INFORMATION: CDR3 of  Light Chain 4E3-F2 (M3)

<400> SEQUENCE: 32
cagcaatctt actcttttcc gctgacg                                             27
```

YKL-40-TARGETING HUMAN MONOCLONAL ANTIBODY

REFERENCE TO THE SEQUENCE LISTING

The Sequence Listing submitted as a text file named "4884_0020001_Seqlisting_ST25" created on Mar. 10, 2022, and having a size of 12,057 bytes is hereby incorporated by reference in its entirety pursuant to 37 C.F.R. § 1.52 (e)(5).

TECHNICAL FIELD

The present disclosure relates to a monoclonal antibody binding specifically to YKL-40, a nucleic acid molecule encoding the same, a pharmaceutical composition for preventing or treating cancer, which contains the monoclonal antibody, and a composition for diagnosing cancer, which contains the monoclonal antibody.

BACKGROUND ART

An antibody is an immunoprotein which binds to a specific antigen. In most mammals including human and mouse, the antibody is formed as a heavy chain polypeptide and a light chain polypeptide are paired. Each chain consists of two regions called a variable region (Fv) and a constant region (Fc). The light chain and heavy chain variable regions include an antigen-binding determinants of the molecule and are involved in binding to a target antigen. The constant regions define the group (or reference sample type) of the antibody (e.g., IgG) and are responsible for binding to a number of Fc receptors and Fc ligands which confers a series of important functional properties called effector function. The antibodies are used as potent therapeutic agents owing to some important characteristic, such as target specificity, the ability of mediating immune mechanism and long serum half-life.

Phage display, first developed in 1990 by the Medical Research Council (UK), is a technique of preparing a human antibody library and screening antibody clones for specific antigens by expressing antibody fragments (Fab, ScFv) on the surface of bacteriophages. It has been proposed that almost all kinds of human recombinant monoclonal antibodies with desired antigen-binding specificity can be isolated from a single-pot antibody library system. Thus, the phage display antibody technique will allow the acquisition of various antibody fragments (Fab or ScFv) that can be used for in-vivo diagnosis or treatment.

REFERENCES OF RELATED ART

[Patent Documents]
U.S. Pat. No. 7,670,599.

DISCLOSURE

[Technical Problem]
The present disclosure is directed to providing a monoclonal antibody binding specifically to YKL-40.
The present disclosure is also directed to providing a nucleic acid molecule encoding the monoclonal antibody.
The present disclosure is also directed to providing a recombinant expression vector containing the nucleic acid molecule.

The present disclosure is also directed to providing a transformant transformed with the recombinant expression vector.

The present disclosure is also directed to providing a pharmaceutical composition for preventing or treating cancer, which contains the monoclonal antibody as an active ingredient.

The present disclosure is also directed to providing a composition for diagnosing cancer, which contains the monoclonal antibody as an active ingredient.

[Technical Solution]

The present disclosure provides a monoclonal antibody binding specifically to YKL-40.

In an exemplary embodiment of the present disclosure, the monoclonal antibody may contain: (a) a heavy chain variable region containing CDR1 consisting of an amino acid sequence of SEQ ID NO 5; CDR2 consisting of an amino acid sequence of SEQ ID NO 6; and CDR3 consisting of an amino acid sequence of SEQ ID NO 7; and (b) a light chain variable region containing CDR1 consisting of an amino acid sequence of SEQ ID NO 11; CDR2 consisting of an amino acid sequence of SEQ ID NO 12; and CDR3 consisting of an amino acid sequence of SEQ ID NO 13, or may contain: (a) a heavy chain variable region containing CDR1 consisting of an amino acid sequence of SEQ ID NO 8; CDR2 consisting of an amino acid sequence of SEQ ID NO 9; and CDR3 consisting of an amino acid sequence of SEQ ID NO 10; and (b) a light chain variable region containing CDR1 consisting of an amino acid sequence of SEQ ID NO 14, CDR2 consisting of an amino acid sequence of SEQ ID NO 15; and CDR3 consisting of an amino acid sequence of SEQ ID NO 16.

In an exemplary embodiment of the present disclosure, the monoclonal antibody may contain: (a) a heavy chain variable region consisting of an amino acid sequence of SEQ ID NO 1; and (b) a light chain variable region consisting of an amino acid sequence of SEQ ID NO 3, or may contain: (a) a heavy chain variable region consisting of an amino acid sequence of SEQ ID NO 2; and (b) a light chain variable region consisting of an amino acid sequence of SEQ ID NO 4.

In an exemplary embodiment of the present disclosure, the monoclonal antibody may be a humanized antibody.

The present disclosure also provides a nucleic acid molecule encoding the monoclonal antibody.

In an exemplary embodiment of the present disclosure, the nucleic acid molecule may contain: (a) a heavy chain variable region containing: CDR1 consisting of a base sequence of SEQ ID NO 21; CDR2 consisting of a base sequence of SEQ ID NO 22; and CDR3 consisting of a base sequence of SEQ ID NO 23; and (b) a light chain variable region containing: CDR1 consisting of a base sequence of SEQ ID NO 27; CDR2 consisting of a base sequence of SEQ ID NO 28; and CDR3 consisting of a base sequence of SEQ ID NO 29, or may contain: (a) a heavy chain variable region containing:CDR1 consisting of a base sequence of SEQ ID NO 24; CDR2 consisting of a base sequence of SEQ ID NO 25; and CDR3 consisting of a base sequence of SEQ ID NO 26; and (b) a light chain variable region containing: CDR1 consisting of a base sequence of SEQ ID NO 30; CDR2 consisting of a base sequence of SEQ ID NO 31; and CDR3 consisting of a base sequence of SEQ ID NO 32.

In an exemplary embodiment of the present disclosure, the nucleic acid molecule may contain: (a) a heavy chain variable region consisting of a base sequence of SEQ ID NO 17; and (b) a light chain variable region consisting of a base sequence of SEQ ID NO 19, or may contain: (a) a heavy chain variable region consisting of a base sequence of SEQ ID NO 18; and (b) a light chain variable region consisting of a base sequence of SEQ ID NO 20.

The present disclosure also provides a recombinant expression vector containing the nucleic acid molecule.

The present disclosure also provides a transformant transformed with the recombinant expression vector.

The present disclosure also provides a pharmaceutical composition for preventing or treating cancer, which contains the monoclonal antibody as an active ingredient.

In an exemplary embodiment of the present disclosure, the cancer may be any one selected from a group consisting of breast cancer, colorectal cancer, lung cancer, stomach cancer, liver cancer, blood cancer, bone cancer, pancreatic cancer, skin cancer, brain cancer, uterine cancer, nasopharyngeal cancer, laryngeal cancer, head and neck cancer, colon cancer, ovarian cancer, rectal cancer, vaginal cancer, small intestine cancer, endocrine cancer, thyroid cancer, parathyroid cancer, ureteral cancer, urethral cancer, prostate cancer, bronchial cancer, bladder cancer, kidney cancer and bone marrow cancer.

The present disclosure also provides a composition for diagnosing cancer, which contains the monoclonal antibody as an active ingredient. In an exemplary embodiment of the present disclosure, the cancer may be any one selected from a group consisting of breast cancer, colorectal cancer, lung cancer, stomach cancer, liver cancer, blood cancer, bone cancer, pancreatic cancer, skin cancer, brain cancer, uterine cancer, nasopharyngeal cancer, laryngeal cancer, head and neck cancer, colon cancer, ovarian cancer, rectal cancer, vaginal cancer, small intestine cancer, endocrine cancer, thyroid cancer, parathyroid cancer, ureteral cancer, urethral cancer, prostate cancer, bronchial cancer, bladder cancer, kidney cancer and bone ow cancer.

[Advantageous Effects]

Since YKL-40 of the present disclosure is associated with proliferation and metastasis of cancer and a monoclonal antibody against YKL-40 exhibits an effect of inhibiting the proliferation and metastasis of cancer, a monoclonal antibody of the present disclosure can be advantageously used for diagnosing, preventing or treating cancer.

BRIEF DESCRIPTION OF DRAWINGS

FIG. 1a schematically shows a process of screening antibodies exhibiting significant binding ability to human YKL-40 through phage display, and FIGS. 1b-1d show results of panning titration for Fab-1, Fab-II and scFv, respectively.

FIG. 2a and FIG. 2b show seven antibodies against human YKL-40 screened through phage display.

FIG. 3a schematically shows a process of screening antibodies exhibiting significant binding ability to mouse YKL-40 through phage display, and FIGS. 3b-3d show results of panning titration for Fab-1, Fab-II and scFv, respectively.

FIG. 4 shows six antibodies against mouse YKL-40 screened through phage display.

FIGS. 5a-5c show a result of conducting SDS-PAGE and measuring IgG production from six clones having human YKL-40 antibodies (H1, H2, H4, H5, H6 and H7).

FIG. 6a and FIG. 6b show a result of SEC (size-exclusion chromatography) for six human YKL-40 antibodies.

FIG. 7 shows a result of measuring $EC_{50}$ for six human YKL-40 antibodies through ELISA.

FIG. 8a and FIG. 8b show a result of conducting SDS-PAGE and measuring IgG production from four clones having mouse YKL-40 antibodies (M2, M3, M4 and M5).

FIG. 9a and FIG. 9b show a result of SEC (size-exclusion chromatography) for four mouse YKL-40 antibodies.

FIG. 10 shows a result of measuring $EC_{50}$ for four mouse YKL-40 antibodies through ELISA.

FIG. 11a and FIG. 11b show a result of investigating whether the human YKL-40 antibody 3A10-F1 (H1) and mouse YKL-40 antibody 4E3-F2 (M3) clones cross-bind to a human YKL-40 antigen and a mouse YKL-40 antigen by ELISA.

FIGS. 12a-12c show a result of measuring the antigen affinity of the human YKL-40 antibody 3A10-F1 (H1) and the mouse YKL-40 antibody 4E3-F2 (M3) for a human YKL-40 antigen and a mouse YKL-40 antigen.

FIGS. 13a-13d show a result of measuring the number of migrated cells in A549 or H460 cells treated with the human YKL-40 antibodies H1, H2, H4, H5, H6 and H7 as candidate antibodies.

FIGS. 14a-14d show a result of measuring the number of migrated cells in A549 or H460 cells treated with the mouse YKL-40 antibodies M2, M3, M4 and M5 as candidate antibodies.

FIG. 15a and FIG. 15b show a result of measuring the tumor area on the lung surface of pulmonary metastasis animal model treated with the human YKL-40 antibodies H1, H2 and H4 or the mouse YKL-40 antibodies M2 and M3 as candidate antibodies (n=3).

FIGS. 16a-16c show a result of measuring the number of tumor nodules in lung tissue of pulmonary metastasis animal model treated with the human YKL-40 antibody H1 or the mouse YKL-40 antibody M3 (n=8).

BEST MODE

In the present disclosure, the term "antibody" immunologically refers to an immunoglobulin molecule having reactivity to a specific antigen and includes a polyclonal antibody and a monoclonal antibody. In addition, the term includes a chimeric antibody (e.g., a humanized murine antibody) and a hybrid antibody (e.g., a bispecific antibody) produced by genetic engineering.

In the present disclosure, the term "monoclonal antibody" is a term known in the art and refers to an antibody with high specificity directed against a single antigenic site. In general, unlike polyclonal antibodies which include divergent antibodies directed against divergent epitopes (antigenic determinants), monoclonal antibodies are directed against a single determinant on an antigen. Monoclonal antibodies are advantageous in that they improve the selectivity and specificity of diagnosis and analytical assay using antigen-antibody binding. In addition, they are advantageous in that they are not contaminated by other immunoglobulins since they are synthesized by hybridoma culture.

Typically, an immunoglobulin has a heavy chain and a light chain, and each of the heavy chain and the light chain includes a constant region and a variable region (the regions are also known as "domains"). The variable regions of the heavy and light chains include three variable regions called "complementarity-determining regions" (hereinafter, referred to as "CDRs") and four "framework regions". The CDR mainly has a role of binding to the epitope of an antigen. The CDR in each chain is called CDR1, CDR2 and CDR3 in sequence, typically starting from the N-terminus, and these are identified by the chain in which a particular CDR is located.

The term "heavy chain" refers to a full-length heavy chain or a fragment including a variable region domain VH, which contains an amino acid sequence having a variable region sequence sufficient to exhibit the specificity against an antigen and three constant region domains $C_{H1}$, $C_{H2}$ and $C_{H3}$. The term "light chain" refers to a full-length light chain or a fragment including a variable region domain $V_L$, which contains an amino acid sequence having a variable region sequence sufficient to exhibit the specificity against an antigen and a constant region domain $C_L$.

In the present disclosure, the term "variable" refers to the fact that a certain portion of the corresponding region differs extensively in sequence among antibodies. The variable region is for binding to a specific antigen with specificity. The variability of the antibody is not evenly distributed through the variable domain of the antibody but is concentrated on CDRs. Each of the heavy chain and the light chain of a monoclonal antibody has three CDRs, which forms an antigen-antibody complex by recognizing a surface antigen. The CDRs have characteristic sequences depending on monoclonal antibodies, and, for one monoclonal antibody to recognize a specific epitope, all or part of the six CDRs may interact with each other.

In the present disclosure, the term "phage display" refers to a technique of screening an antibody exhibiting binding ability to an antigen by screening a phage that exhibits significant binding ability to the target antigen from a phage library. In this technique, "panning" refers to a process of screening a phage that expresses a peptide capable of binding to a target molecule (antibody, enzyme, cell surface receptor, etc.) from a library of phages that express (display) the peptide on the coat of the phages. An antibody that exhibits significant binding ability for the target antigen can be screened by repeating this process 3-10 times, and the screened antibody can be prepared as a humanized monoclonal antibody.

The monoclonal antibody of the present disclosure may include variants of the amino acid sequences described in the attached sequence listings, which can bind specifically to YKL-40. For example, the amino acid sequence of the monoclonal antibody may be varied to improve the binding affinity and/or other biological characteristics of the monoclonal antibody. Such variation includes, for example, the deletion, insertion and/or substitution of the amino acid sequence residue of the monoclonal antibody. The amino acid variation is accomplished based on the relative similarity, e.g., hydrophobicity, hydrophilicity, charge, size, etc., of an amino acid side-chain substituent. Analysis of the size, shape, type, etc. of amino acid side-chain substituents reveals that arginine, lysine and histidine are positively charged residues; alanine, glycine and serine have similar sizes; and phenylalanine, tryptophan and tyrosine have similar shapes. Accordingly, based on this, it can be said that arginine, lysine and histidine; alanine, glycine and serine; and phenylalanine, tryptophan and tyrosine are biologically functional equivalents. When introducing variation, the hydropathy indices of amino acids may be considered. Each amino acid has been assigned a hydropathy index depending on hydrophobicity and charge: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5). The hydropathy index is very important in conferring interactive biological function on a protein. It is known that certain amino acids may be substituted with other amino acids having a similar hydropathy index and still retain a similar biological activity. When introducing variation based on the hydropathy index, the substation of amino acids whose hydropathy indices are within ±2 are preferred, those within ±1 are more preferred, and those within ±0.5 are further more preferred.

It is also well known that proteins having equivalent biological activity are obtained through substitution of amino acids having similar hydrophilicity values. Each amino acid residue has been assigned a hydrophilicity value as disclosed in U.S. Pat. No. 4,554,101: arginine (+3.0); lysine (+3.0); aspartate (+3.0±1); glutamate (+3.0 1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); and tryptophan (−3.4). When introducing variation based on the hydrophilicity value, the substation of amino acids whose hydrophilicity values are within ±2 are preferred, those within ±1 are more preferred, and those within ±0.5 are further more preferred. The exchange of amino acids in proteins, which does not substantially alter molecular activity, is known in the art (H. Neurath, R. L. Hill, The Proteins, Academic Press, New York, 1979). The most common exchanges are exchanges between amino acid residues Ala/Ser, Val/Ile, Asp/Glu, Thr/Ser, Ala/Gly, Ala/Thr, Ser/Asn, Ala/Val, Ser/Gly, Thy/Phe, Ala/Pro, Lys/Arg, Asp/Asn, Leu/Ile, Leu/Val, Ala/Glu and Asp/Gly. Considering the foregoing variations having biologically equivalent activity, the monoclonal antibody of the present disclosure or the nucleic acid molecule encoding the same is construed to also include sequences having substantial identity to the sequences described in the sequence listings. The substantial identity means that, when the sequence of the present disclosure and another sequence are aligned to correspond to each other as much as possible and the aligned sequences are analyzed using an algorithm that is commonly used in the art, they have at least 61%, more specifically at least 70%, further more specifically at least 80%, and most specifically at least 90% sequence identity.

In the present disclosure, the term "nucleic acid molecule" includes DNA (gDNA and cDNA) and RNA molecules, and the nucleotide as a basic constituent in the nucleic acid molecule includes not only naturally occurring nucleotides but also analogues with modified sugars or bases (Scheit, Nucleotide Analogs, John Wiley, New York (1980); Uhlman and Peyman, *Chemical Reviews,* 90:543-584 (1990)). The base sequence of the nucleic acid molecule encoding the heavy chain variable region and the light chain variable region of the monoclonal antibody of the present disclosure may be modified. Such modification includes addition, deletion, or non-conservative or conservative substitution of the nucleotide.

A vector prepared in the present disclosure is constructed to express a desired gene in a host cell. In general, a promoter and a terminator, which are operatively linked, are located upstream and downstream of the vector, respectively.

In the present disclosure, the term "promoter" refers to a coding sequence or a DNA sequence that regulates the expression of RNA. In the recombinant vector of the present disclosure, a target base sequence is operatively linked to the promoter.

In the present disclosure, the term "operatively linked" refers to a functional linkage between a nucleic acid expression control sequence (e.g., a promoter sequence, a signal sequence, or an array of a transcription regulation factorbinding site) and another nucleic acid sequence and, through the linkage, the control sequence controls the transcription and/or translation of the another nucleic acid sequence.

The vector system of the present disclosure may be constructed by various methods known in the art, and specific methods are described in Sambrook et al., Molecular Cloning, A Laboratory Manual, Cold Spring Harbor Laboratory Press (2001). The vector of the present disclosure may be typically constructed as a vector for expression.

The transformant of the vector of the present disclosure may be delivered into a host cell by heat shock method, $CaCl_2$. method (Cohen, S. N. et al., *Proc. Natl. Acac. Sci. USA*, 9: 2110-2114 (1973)), Hanahan's method (Cohen, S. N. et al., *Proc. Natl. Acac. Sci. USA*, 9: 2110-2114 (1973); and Hanahan, D., *J. Mol. Biol.*, 166: 557-580 (1983)), electroporation method (Dower, W. J. et al., *Nucleic. Acids Res.*, 16: 6127-6145 (1988)), etc.

The pharmaceutical composition of the present disclosure may further contain a pharmaceutically acceptable carrier. In the present disclosure, the term "pharmaceutically acceptable" means that the composition exhibits no toxicity to cells or human. The carrier may be any one known in the art, such as a buffer, a preservative, an analgesic, a solubilizer, an isotonic agent, a stabilizer, a matrix, an excipient, a lubricant, etc.

In addition, the pharmaceutical composition of the present disclosure may be formulated into an oral formulation such as a powder, a granule, a tablet, a capsule, a suspension, an emulsion, a syrup, an aerosol, etc., a formulation for external application, a suppository or a sterile injection solution according to common methods. In addition, it may be formulated into a formulation for external application to skin, such as an ointment, a lotion, a spray, a patch, a cream, a powder, a suspension or a gel. A carrier, excipient or diluent that may be contained in the composition of the present disclosure may include lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate and mineral oil. The composition is prepared by mixing with a commonly used diluent or excipient such as a filler, an extender, a binder, a wetting agent, a disintegrant, a surfactant, etc.

Solid formulations for oral administration include a tablet, a pill, a powder, a granule, a capsule, etc., and such solid formulations are prepared by mixing with at least one excipient, e.g., starch, calcium carbonate, sucrose, lactose, gelatin, etc. In addition to the simple excipient, a lubricant such as magnesium stearate or talc is also used. Liquid formulations for oral administration include a suspension, a liquid for internal use, an emulsion, a syrup, etc. They may contain, in addition to a commonly used simple diluent such as water or liquid paraffin, various excipients, e.g., a wetting agent, a sweetener, an aromatic, a preservative, etc. Formulations for parenteral administration include a sterilized aqueous solution, a nonaqueous solution, a suspension, an emulsion, a freeze-dried formulation and a suppository. For the nonaqueous solution or suspension, propylene glycol, polyethylene glycol, vegetable oil such as olive oil, injectable ester such as ethyl oleate, etc. may be used. As a base of the suppository, witepsol, macrogol, Tween 61, cocoa butter, laurin butter, glycerogelatin, etc. may be used.

The pharmaceutical composition of the present disclosure is administered in a pharmaceutically effective amount. In the present disclosure, the term "administration" refers to introduction of a substance into a subject with a suitable method, and the composition may be administered via any administration route accessible to a target tissue. Examples include intraperitoneal administration, intravenous administration, intramuscular administration, subcutaneous administration, intracutaneous administration, oral administration, topical administration, intranasal administration, intrapulmonary administration and intrarectal administration, although not being limited thereto.

The term "subject" refers to any animal including human, rat, mouse, livestock, etc. Specifically, it may be a mammal including human.

The term "pharmaceutically effective amount" refers to an amount sufficient to treat a disease at a reasonable benefit/risk ratio applicable to medical treatment without causing side effects. An effective dosage level may be determined easily by those skilled in the art depending on various factors the sex, age, body weight and health status of a patient, the type and severity of a disease, drug activity, drug sensitivity, administration method, administration time, administration route, excretion ratio, treatment period and concurrently used drugs, and other factors well known in the medical. The administration may be made once or several times a day.

Hereinafter, the present disclosure is described in more detail through examples. The examples are provided only to describe the present disclosure more specifically and the scope of the present disclosure is not limited by the examples.

EXAMPLE 1

Phage Display Library Panning

YKL-40 (chitinase-3-like protein 1) is a secreted glycoprotein of about 40 kDa encoded by the CHI3L1 gene. It is known to be secreted by various cell types including macrophages, etc. According to a recent study, YKL-40 is thought to play an important role in the proliferation, survival and metastasis of cancer cells. In a previous research, it was found that the expression of YKL-40 was suppressed in 38 cancers out of 49 diseases and 8 among them were associated with lung cancer. Therefore, the inventors of the present disclosure have conducted experiments to screen an antibody capable of suppressing the expression of YKL-40.

Antibodies exhibiting significant binding ability for human YKL-40 (hYKL-40) were screened by phage display (FIGS. 1a-1d). The binding ability for hYKL-40 was confirmed by ELISA for hYKL-40 phage. Briefly, 30 ng of hYKL-40 antigen was immobilized per well. After blocking the antigen-immobilized well with MPBS (5% skim milk in PBS), hYKL-40 phage and mYKL-40 phage were added. For detection of bound phages, anti-M13-HRP (1:5,000) was added after washing 4 times with PBST (0.05% Tween20 in PBS). Finally, after washing 4 times with PBST, color development was induced by adding TMB (3,3',5,5'-tetramethylbenzidine). After terminating the reaction by adding 2N $H_2SO_4$, absorbance was measured for each well at 450 nm.

As a result, seven clones having antibodies against hYKL-40 were screened from the Fab-I library and the Fab-II library, whereas no clone was formed from the scFv library (FIG. 2a and FIG. 2b). The two clones from the Fab-I library were denoted as 3A10-F1 (H1) and 3B12-F1 (H2), and the five clones from the KFab-ll library were denoted as 3A11-F2 (H3), 3B7-F2 (H4), 3D12-F2 (H5), 3E12-F2 (H6) and 3G7-F2 (H7), respectively.

In addition, antibodies exhibiting significant binding ability for mouse YKL-40 (mYKL-40) were screened (FIGS.

3a-3d). The binding ability for mYKL-40 was confirmed by ELISA for mYKL-40 phage. Briefly, 30 ng of mYKL-40 antigen was immobilized per well. After blocking the antigen-immobilized well with MPBS (5% skim milk in PBS), hYKL-40 phage and mYKL-40 phage were added. For detection of bound phages, anti-M13-HRP (1:5,000) was added after washing 4 times with PBST (0.05% Tween20 in PBS), Finally, after washing 4 times with PBST, color development was induced by adding TMB (3,3',5,5'-tetramethylbenzidine). After terminating the reaction by adding 2N $H_2SO_4$, absorbance was measured for each well at 450 nm. As a result, six antibodies were screened from the Fab-II library, and no clone was formed from the Fab-1 or scFv library (FIG. 4). The six clones from the Fab-II library were denoted as 4A12-F2 (M1), 4E12-F2 (M2). 4E3-F2 (M3), 4D10-F2 (M4), 4A7-F2 (M5) and 4A1-F2 (M6), respectively.

EXAMPLE 2

Production and Characterization of IgG

The inventors of the present disclosure have conducted experiments to transform the screened YKL-40 phage into human IgG antibody. Briefly, the screened YKL-40 phage was transformed into Expi293 cells. After culturing the Expi293 cells, IgG was purified from 300 mL of the cell culture. The molecular weight and purity of the purified IgG were investigated by SDS-PAGE.

As a result, IgG was produced from the six clones having hYKL-40 antibodies. Finally, 0.237 mg of IgG was produced from 3A10-F1 (H1), 1.84 mg of IgG from 3B12-F1 (H2), 6.5 mg of IgG from 3B7-F2 (H4), 0.3 mg of IgG3D12-F2 (H5), 0.8 mg of IgG from 3E12-F2 (H6), and 5.3 mg of IgG from 3G7-F2 (H7) (FIGS. 5a-5c).

In addition, the inventors of the present disclosure have investigated whether the antibodies were monoclonal antibodies by SEC (size-exclusion chromatography), and have measured the affinity of the antibodies for an antigen by measuring $EC_{50}$ through ELISA. As a result, all of 3A10-F1 (H1), 3B12-F1 (H2), 3B7-F2 (H4), 3D12-F2 (H5), 3E12-F2 (H6) and 3G7-F2 (H7) were identified as monoclonal antibodies because they showed single peaks in SEC (FIG. 6a and FIG. 6b), In ELISA, 3A10-F1 (H1) showed the lowest $EC_{50}$ value as 582 pM (0.582 nM) (FIG. 7). The inventors of the present disclosure have conducted the same experiments for the screened mouse YKL-40 phages. As a result, 1.6 mg of IgG was produced from 4E12-F2 (M2), 3.6 mg of IgG from 4E3-F2 (M3), 6.3 mg of IgG from 4D10-F2 (M4), and 0.7 mg of IgG from 4A7-F2 (M5) (FIG. 8a and FIG. 8b).

In addition, all of 4E12-F2 (M2), 4E3-F2 (M3), 4D10-F2 (M4) and 4A7-F2 (M5) were identified as monoclonal antibodies because they showed single peaks in SEC (FIG. 9a and FIG. 9b). In ELISA, 4E3-F2 (M3) showed the lowest $EC_{50}$ value as 67 pM (0.067 nM) (FIG. 10).

In addition, the inventors of the present disclosure have conducted ELISA using the Fab protein of each antibody in order to investigate whether the 3A10-F1 (H1) and 4E3-F2 (M3) clones that showed the lowest $EC_{50}$ values for hYKL-40 and mYKL-40, respectively, cross-bind to hYKL-40 and mYKL-40. As a result, it was found that 3A10-F1 (H1) binds only to hYKL-40, whereas 4E3-F2 (M3) cross-binds to hYKL-40 and mYKL-40 (FIG. 11a and FIG. 11b).

To reconfirm the $EC_{50}$ value measured by ELISA, the affinity for 4E3-F2 (M3) and 3A10-F1 (H1) was measured using an Octet instrument. Cross-binding was investigated for the two antibodies using hYKL-40 and mYKL-40. Each antigen protein was immobilized using the AR2G (Amine Reactive 2nd Generation) sensor, and the direct immobilization method of binding each antibody with different concentrations (0-1 μM) was employed. As a result, 4E3-F2 (M3) showed binding to the mouse and human antigen proteins at similar levels, with $K_D$ values of $6.7×10^{-8}$ M and $5.7×10^{-8}$ M for mYKL-40 and hYKL-40, respectively. 3A10-F1 (H1) did not bind to mYKL-40 and showed binding to hYKL-40 with a $K_D$ value of $5.0×10^{-11}$ M (FIGS. 12a-12c).

EXAMPLE 3

Analysis of Anticancer Effect of Candidate Antibodies in Vitro

The inventors of the present disclosure have investigated whether the candidate antibodies against YKL-40 have the effect of suppressing metastasis of lung cancer cells. Briefly, the migration of A549 cells and H460 cells, which are human lung cancer cells, was tested quantitatively on permeable inserts (8-μm pore trans-well; Corning Inc.). After treating the A549 and H460 lung cancer cells with the hYKL-40 antibodies 3A10-F1 (H1), 3B12-F1 (H2), 3B7-F2 (H4), 3D12-F2 (H5), 3E12-F2 (H6) and 3G7-F2 (H7) and the mYKL-40 antibodies 4E12-F2 (M2), 4E3-F2 (M3), 4D10-F2 (M4) and 4A7-F2 (M5) as candidate antibodies at a concentrated of 1 μg/mL, the A549 and H460 cells treated with the candidate antibodies were plated at $2.0×10^4$ cells per well and incubated in a humidified 5% $CO_2$ incubator at 37° C. for 17 hours. After the incubation, the cells were fixed with 3.7% formaldehyde for 2 minutes and then washed with 1× PBS twice. Then, the cells were permeated with 100% methanol for 15 minutes and stained with trypan blue for 20 minutes. Non-migrated cells inside the wells were removed with a cotton swab and the images captured with an optical microscope (Olympus) at ×200 magnification were analyzed using the NIH ImageJ software.

As a result, the treatment with the six antibodies against hYKL-40 resulted in decreased number of migrated cells as compared to a control group for both the A549 cells and the H460 cells. In particular, the number of migrated cells was decreased remarkably when the cells were the treated with the 3A10-F1 (H1), 3B12-F1 (H2) and 3B7-F2 (H4) antibodies (FIGS. 13a-13d). Similarly, the treatment with the four antibodies against mYKL-40 resulted in decreased number of migrated cells as compared to a control group for both the A549 cells and the H460 cells. In particular, the number of migrated cells was decreased remarkably when the cells were the treated with the 4E12-F2 (M2) and 4E3-F2 (M3) antibodies (FIGS. 14a-14d).

From these results, it was confirmed that the screened 3A10-F1 (H1), 3B12-F1 (H2), 3B7-F2 (H4), 4E12-F2 (M2) and 4E3-F2 (M3) antibodies have the effect of suppressing the metastasis of lung cancer cells by inhibiting the YKL-40 protein.

EXAMPLE 4

Analysis of Anticancer Effect of Candidate Antibodies in Animal Experiments (in vivo)

The inventors of the present disclosure have investigated whether the five candidate antibodies screened in the experiments described above have the effect of suppressing cancer metastasis in a pulmonary metastasis animal model. Briefly, after inducing pulmonary metastasis by injecting B16F10 mouse melanoma cells (3.75×10⁴ cells) per mouse into the tail vein, the hYKL-40 antibodies 3A10-F1 (H1), 3B12-F1 (H2) and 3B7-F2 (H4) and the mYKL-40 antibodies 4E12-F2 (M2) and 4E3-F2 (M3) were injected at 0.5 mg/kg once a week for a total of 3 weeks. At week 3 after the injection of the melanoma cells, the lung was extracted and the tumor area on the lung surface was measured.

As a result, the treatment with 3A10-F1 (H1) among the hYKL-40 antibodies and 4E3-F2 (M3) among the mYKL-40 antibodies remarkably decreased tumor area on the lung surface as compared to a control group (FIG. 15a arid FIG. 15b). This result is consistent with the $EC_{50}$ measurement for the cells, confirming that the H1 and M3 antibodies have the effect of suppressing lung cancer metastasis.

In addition, the inventors of the present disclosure have further investigated whether the screened YKL-40 antibodies 3A10-F1 (H1) and 4E3-F2 (M3) have the effect of suppressing cancer metastasis by increasing the number of experimental animals. As a result, both 3A10-F1 (H1) and 4E3-F2 (M3) had the effect of suppressing lung cancer metastasis since the number of tumor nodules on the lung tissue surface was decreased as compared to a control group. In particular, the 3A10-F1 (H1) antibody was found to have a remarkable effect of decreasing the number of tumor nodules (FIGS. 16a-16c).

From these results, it was confirmed that the 3A10-F1 (H1) antibody against YKL-40 has a remarkable effect of suppressing lung cancer.

EXAMPLE 5

Analysis of Antibody Sequences

The inventors of the present disclosure have analyzed the sequences of the 3A10-F1 (H1) antibody and the 4E3-F2 (M3) antibody which have been confirmed to have the effect of suppressing cancer. The amino acid sequences of the heavy chain variable regions for the 3A10-F1 (H1) antibody and the 4E3-F2 (M3) antibody are shown in Table 1, and the amino acid sequences of the light chain variable regions are shown in Table 2. The amino acid sequences of CDR1 to CDR3 of the heavy chain variable regions are shown in Table 3, and the amino acid sequences of CDR1 to CDR3 of the light chain variable regions are shown in Table 4.

In addition, the base sequences of the heavy chain variable regions for the nucleic acid molecules encoding the antibodies are shown in Table 5, and the base sequences of the light chain variable regions are shown in Table 6. The base sequences encoding CDR1 to CDR3 in the heavy chain variable regions are shown in Table 7, and the base sequences encoding CDR1 to CDR3 in the light chain variable region are shown in Table 8.

TABLE 1

| Antibody | Amino acid sequence of antibody heavy chain variable region (CDRs: underlined) |
|---|---|
| 3A10-F1 (H1) | EVQLVESGGGLVQPGGSLRLSCAASGFTFS NYAMS WVRQ APGKGLEWVS GISGSGGTTYYADSVKG RFTISRDNSKNT LYLQMNSLRAEDTAVYYCAG VGTFDV WGQGTLVTVSS (SEQ ID NO 1) |
| 4E3-F2 (M3) | QVQLVQSGAEVKKPGSSVKVSCKASGGTFS SYDIH WVRQ APGQGLEWMG IISPYLGITIYAQKFQG RVTITADESTST AYMELSSLRSEDTAVYYCAR RYFYYQSEAFDY WGQGTLV TVSS (SEQ ID NO 2) |

TABLE 2

| Antibody | Amino acid sequence of antibody light chain variable region (CDRs: underlined) |
|---|---|
| 3A10-F1 (H1) | DIQMTQSPSSLSASVGDRVTITC RASQTISSWLN WYQQ KPGKAPKLLIY AASRLQS GVPSRFSGSGSGTDFTLTIS SLQPEDFATYYC QQSYSTPLT FGQGTKVEIK (SEQ ID NO 3) |
| 4E3-F2 (M3) | DIQMTQSPSSLSASVGDRVTITC RASQSISNYLN WYQQ KPGKAPKLLIY AASTLQS GVPSRFSGSGSGTDFTLTIS SLQPEDFATYYC QQSYSFPLT FGQGTKVEIK (SEQ ID NO 4) |

TABLE 3

| Antibody | CDRH1 | CDRH2 | CDRH3 |
|---|---|---|---|
| 3A10-F1 (H1) | NYAMS (SEQ ID NO 5) | GISGSGGTTYYAD SVKG (SEQ ID NO 6) | VGTFDV (SEQ ID NO 7) |
| 4E3-F2 (M3) | SYDIH (SEQ ID NO 8) | HSPYLGITIYAQK FQG (SEQ ID NO 9) | RYFYYQSEAFDY (SEQ ID NO 10) |

TABLE 4

| Antibody | CDRL1 | CDRL2 | CDRL3 |
|---|---|---|---|
| 3A10-F1 (H1) | RASQTISSWLN (SEQ ID NO 11) | AASRLQS (SEQ ID NO 12) | QQSYSTPLT (SEQ ID NO 13) |
| 4E3-F2 (M3) | RASQSISNYLN (SEQ ID NO 14) | AASTLQS (SEQ ID NO 15) | QQSYSFPLT (SEQ ID NO 16) |

TABLE 5

| Antibody | Base sequence of antibody heavy chain variable region (CDRs: underlined) |
|---|---|
| 3A10-F1 (H1) | GAAGTACAGTTGGTCGAAAGTGGCGGTGGCCTCGTGCAAC CGGGTGGTTCACTGCGTCTGAGCTGCGCCGCCTCGGGTTT TACTTTCTCT AATTATGCAATGTCT TGGGTTCGTCAGG CGCCGGGCAAGGGTCTCGAATGGGTTTCA GGTATCTCTG GTTCTGGTGGTACTACTTACTATGCCGATTCAGTGAAGGG T CGCTTTACCATTTCCCGTGACAACTCTAAGAATACTCT GTATCTGCAGATGAACTCGCTGCGTGCCGAAGACACGGCC GTCTATTATTGCGCCGGT GTTGGTACTTTCGATGTT TG GGGTCAGGGCACTTTAGTGACCGTCTCATCG (SEQ ID NO 17) |
| 4E3-F2 (M3) | CAAGTTCAGCTGGTCCAGAGCGGCGCAGAGGTGAAGAAGC CCGGCAGTTCTGTTAAGGTTTCCTGCAAAGCCTCAGGCGG GACTTTTAGTTCTTACGATATCCAT TGGGTGCGGCAGGC GCCCGGCCAGGGTCTCGAATGGATGGGG ATCATTTCTCC ATACCTGGGTATCACCATCTATGCACAAAAATTCCAAGGC CGCGTAACTATTACCGCCGACGAATCAACCTCCACCGCCT ACATGGAACTCAGCTCTCTGAGGTCAGAAGACACGGCCGT CTATTATTGCGCCAGA CGTTACTTCTACTACCAGTCTGA AGCATTCGATTAC TGGGGTCAGGGTACTCTGGTTACCGT CTCATCG (SEQ ID NO 18) |

TABLE 6

| Antibody | Base sequence of antibody light chain variable region (CDRs: underlined) |
|---|---|
| 3A10-F1 (H1) | GACATTCAAATGACGCAGAGTCCCTCCTCACTGAGTGCTA GCGTGGGCGATCGTGTGACAATTACTTGT CGCGCTAGCC AGACTATCTCTTCTTGGCTGAAC TGGTATCAGCAGAAAC CGGGCAAGGCGCCAAAATTGCTGATTTAC GCAGCATCCC GTCTGCAGTCT GGTGTACCGTCCCGTTTCTCTGGCAGCG GTTCTGGTACGGATTTTACCCTGACCATCTCAAGCCTCCA GCCTGAAGATTTTGCCACCTATTATTGT CAGCAATCTTA CTCTACTCCGCTGACG TTCGGGCAGGGAACTAAAGTGGA AATTAAA (SEQ ID NO 19) |
| 4E3-F2 (M3) | GACATTCAAATGACGCAGAGTCCCTCCTCACTGAGTGCTA GCGTGGGCGATCGTGTGACAATTACTTGT CGCGCTAGCC AGTCTATCTCTAATTACCTGAAC TGGTATCAGCAGAAAC CGGGCAAGGCGCCAAAATTGCTGATTTAC GCAGCATCCA CTCTGCAGTCT GGTGTACCGTCCCGTTTCTCTGGCAGCG GTTCTGGTACGGATTTTACCCTGACCATCTCAAGCCTCCA GCCTGAAGATTTTGCCACCTATTATTGT CAGCAATCTTA CTCTTTTCCGCTGACG TTCGGGCAGGGAACTAAAGTGGA AATTAAA (SEQ ID NO 20) |

TABLE 7

| Antibody | CDRH1 | CDRH2 | CDRH3 |
|---|---|---|---|
| 3A10-F1 (H1) | AATTATGCAAT GTCT (SEQ ID NO 21) | GGTATCTCTGG TTCTGGTGGTA CTACTTACTAT GCCGATTCAGT GAAGGGT (SEQ ID NO 22) | GTTGGTACTTT CGATGTT (SEQ ID NO 23) |
| 4E3-F2 (M3) | TCTTACGATAT CCAT (SEQ ID NO 24) | ATCATTTCTCC ATACCTGGGTA TCACCATCTAT GCACAAAAATT CCAAGGC (SEQ ID NO 25) | CGTTACTTCTA CTACCAGTCTG AAGCATTCGAT TAC (SEQ ID NO 26) |

TABLE 8

| Antibody | CDRL1 | CDRL2 | CDRL3 |
|---|---|---|---|
| 3A10-F1 (H1) | CGCGCTAGCCAGA CTATCTCTTCTTG GCTGAAC SEQ ID NO 27 | GCAGCATCCCGT CTGCAGTCT SEQ ID NO 28) | CAGCAATCTTACTC TACTCCGCTGACG (SEQ ID NO 29) |
| 4E3-F2 (M3) | CGCGCTAGCCAGT CTATCTCTAATTA CCTGAAC (SEQ ID NO 30) | GCAGCATCCACT CTGCAGTCT (SEQ ID NO 31) | CAGCAATCTTACTC TTTTCCGCTGACG (SEQ ID NO 32) |

---

The invention claimed is:

1. A monoclonal antibody, or antigen binding portion thereof, which specifically binds to YKL-40, which comprises: (a) a heavy chain variable region comprising CDR1 comprising the amino acid sequence set forth in SEQ ID NO 5; CDR2 comprising the amino acid sequence set forth in SEQ ID NO 6; and CDR3 comprising the amino acid sequence set forth in SEQ ID NO 7; and (b) a light chain variable region comprising CDR1 comprising the amino acid sequence set forth in SEQ ID NO 11; CDR2 comprising the amino acid sequence set forth in SEQ ID NO 12; and CDR3 comprising the amino acid sequence set forth in SEQ ID NO 13.

2. The monoclonal antibody, or antigen binding portion thereof, according to claim 1, wherein the heavy chain variable region comprises the amino acid sequence set forth in SEQ ID NO 1; and the light chain variable region comprises the amino acid sequence set forth in SEQ ID NO 3.

3. The monoclonal antibody, or antigen binding portion thereof, according to claim 1, which is a human antibody, a humanized antibody, or a chimeric antibody.

4. A hybrid antibody comprising the monoclonal antibody, or antigen binding portion thereof, according to claim 1.

5. The hybrid antibody according to claim 4, which comprises a bispecific antibody.

6. A nucleic acid molecule encoding the monoclonal antibody, or antigen binding portion thereof, according to claim 1.

7. The nucleic acid molecule according to claim 6, wherein a nucleotide sequence encoding the heavy chain variable region comprises the base sequence set forth in SEQ ID NO 17; and a nucleotide sequence encoding the light chain variable region comprises the base sequence set forth in SEQ ID NO 19.

8. A recombinant expression vector comprising the nucleic acid molecule according to claim 6.

9. A cell transformed with the recombinant expression vector according to claim 8.

10. A pharmaceutical composition comprising the monoclonal antibody, or antigen binding portion thereof, according to claim 1, a nucleic acid molecule encoding the monoclonal antibody, or antigen binding portion thereof, a vector comprising the nucleic acid molecule, or a cell comprising the vector as an active ingredient.

* * * * *